Sept. 19, 1967  J. C. FREDLEY ET AL  3,342,573
METHOD OF HEAT TREATING GLASS SHEETS
ON A GASEOUS SUPPORT BED
Original Filed Nov. 9, 1962  17 Sheets-Sheet 11
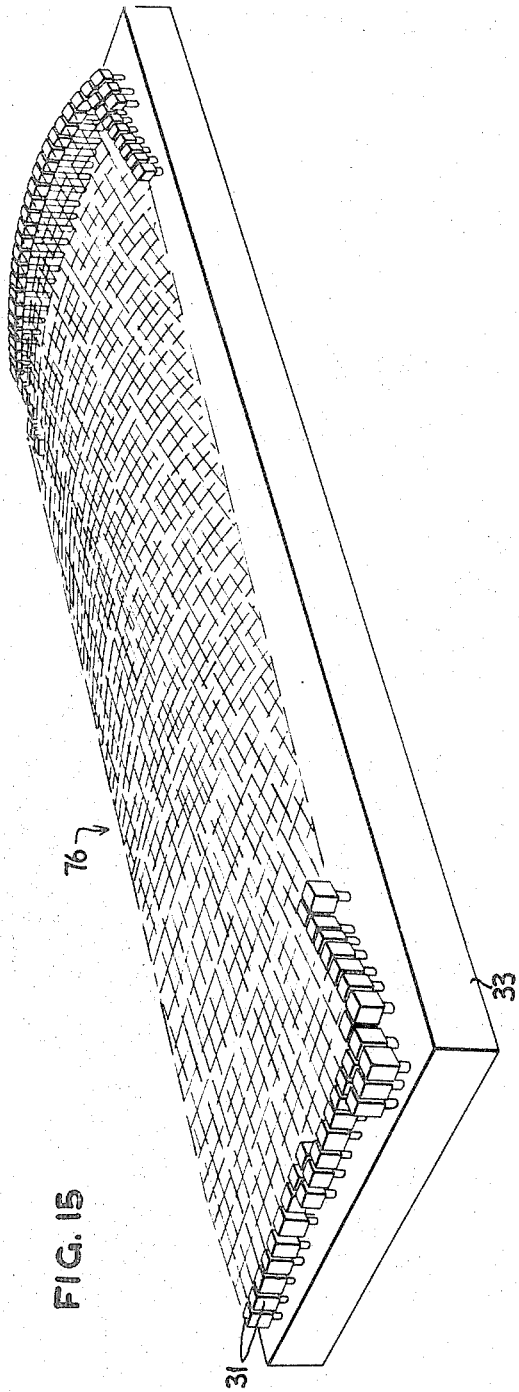
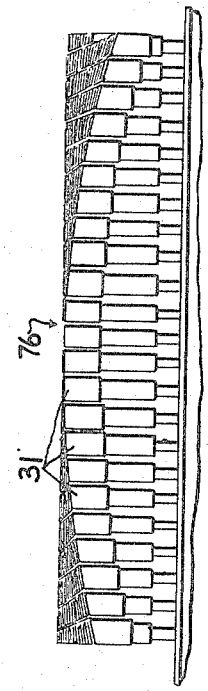
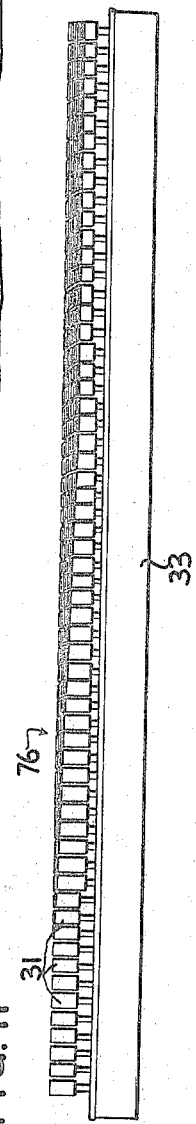
INVENTORS
JAMES C. FREDLEY and
GEORGE E. SLEIGHTER

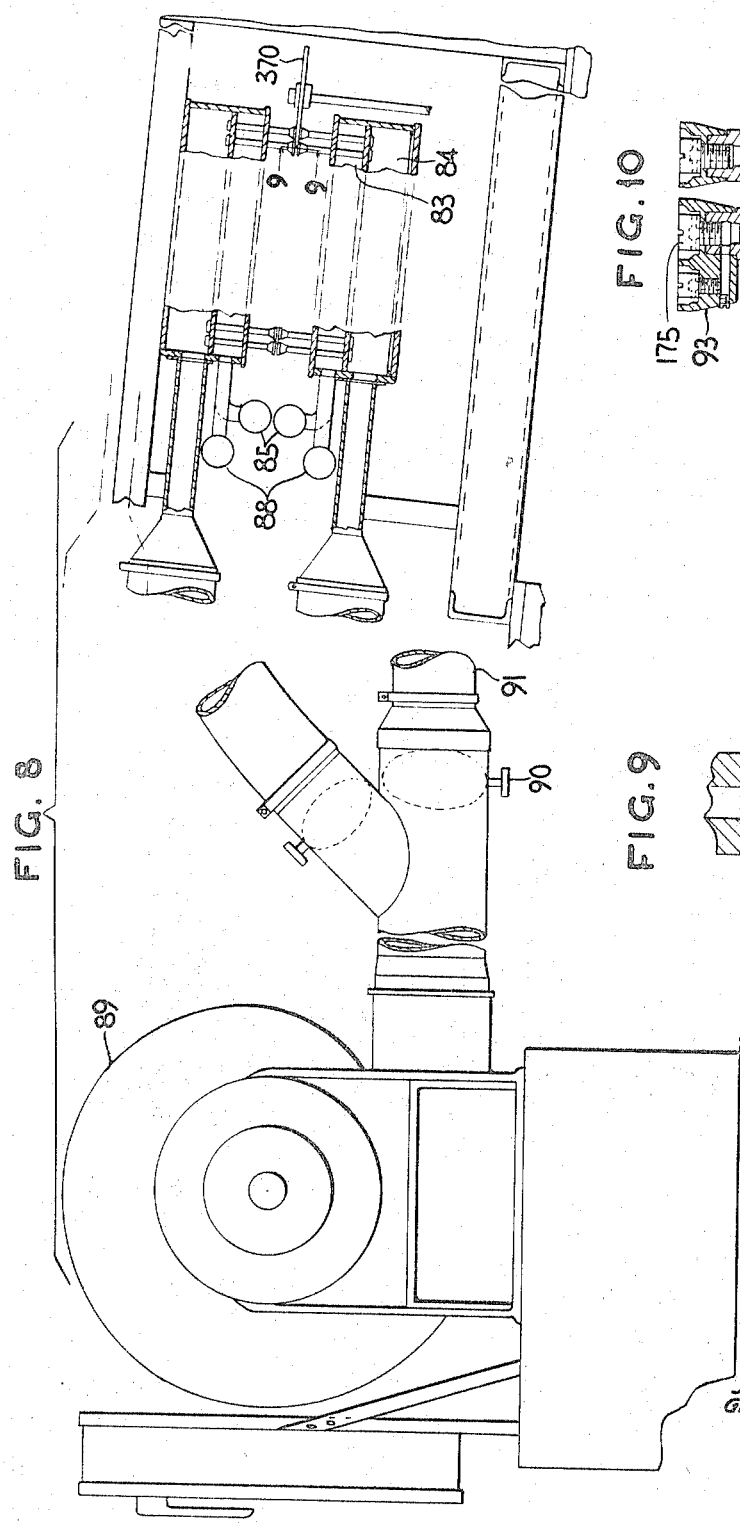

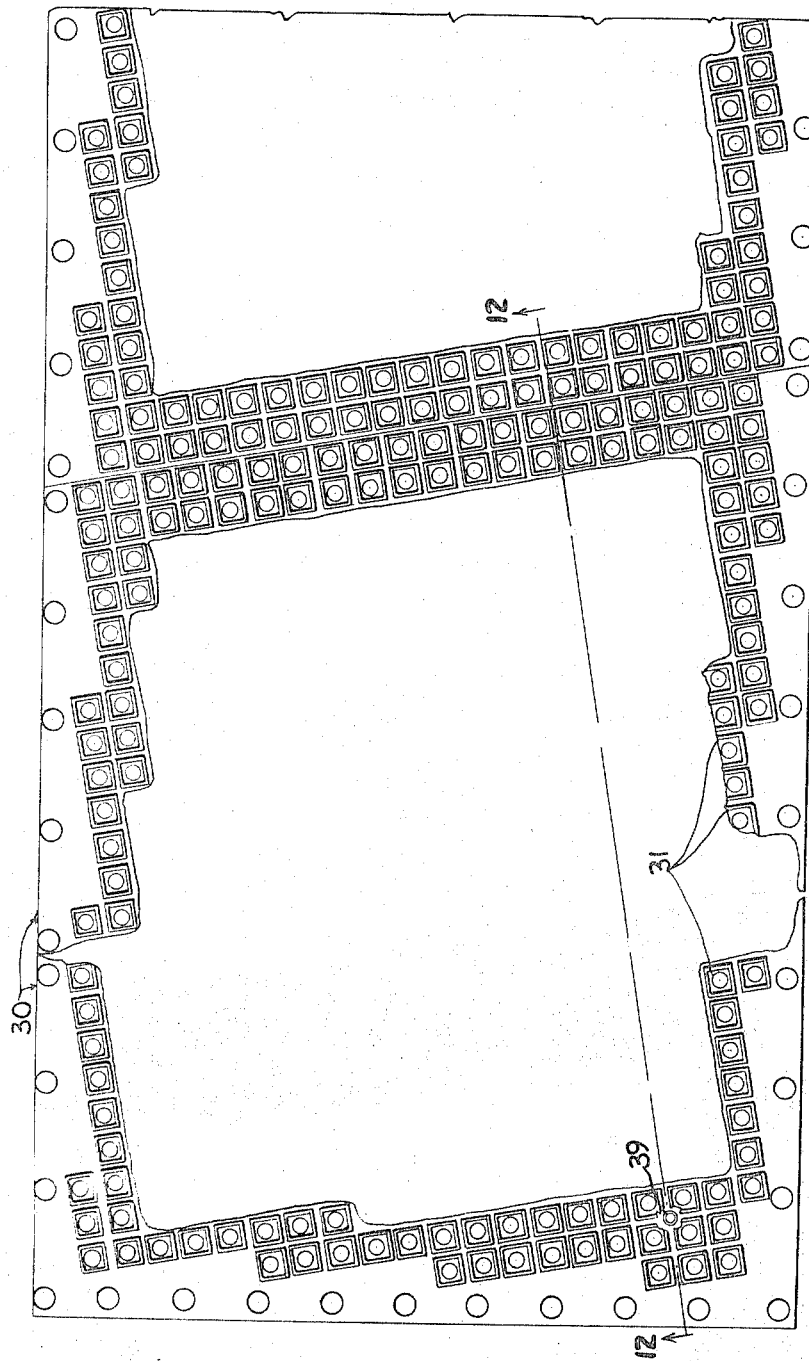
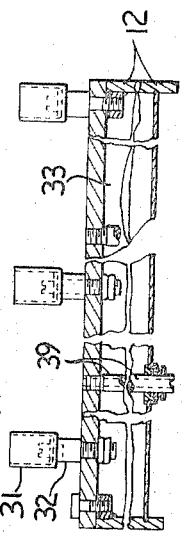

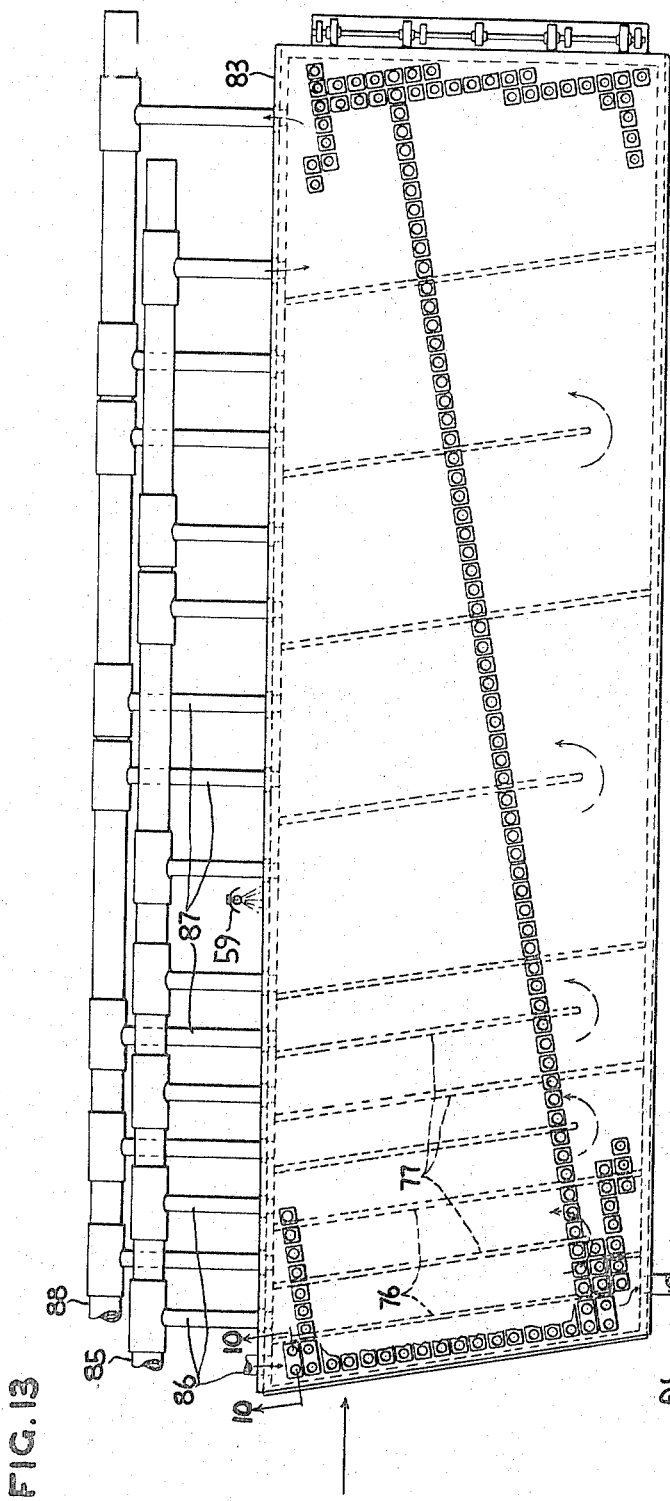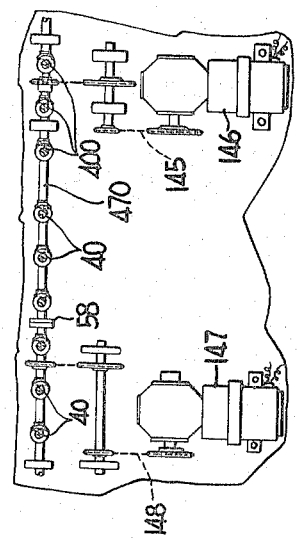

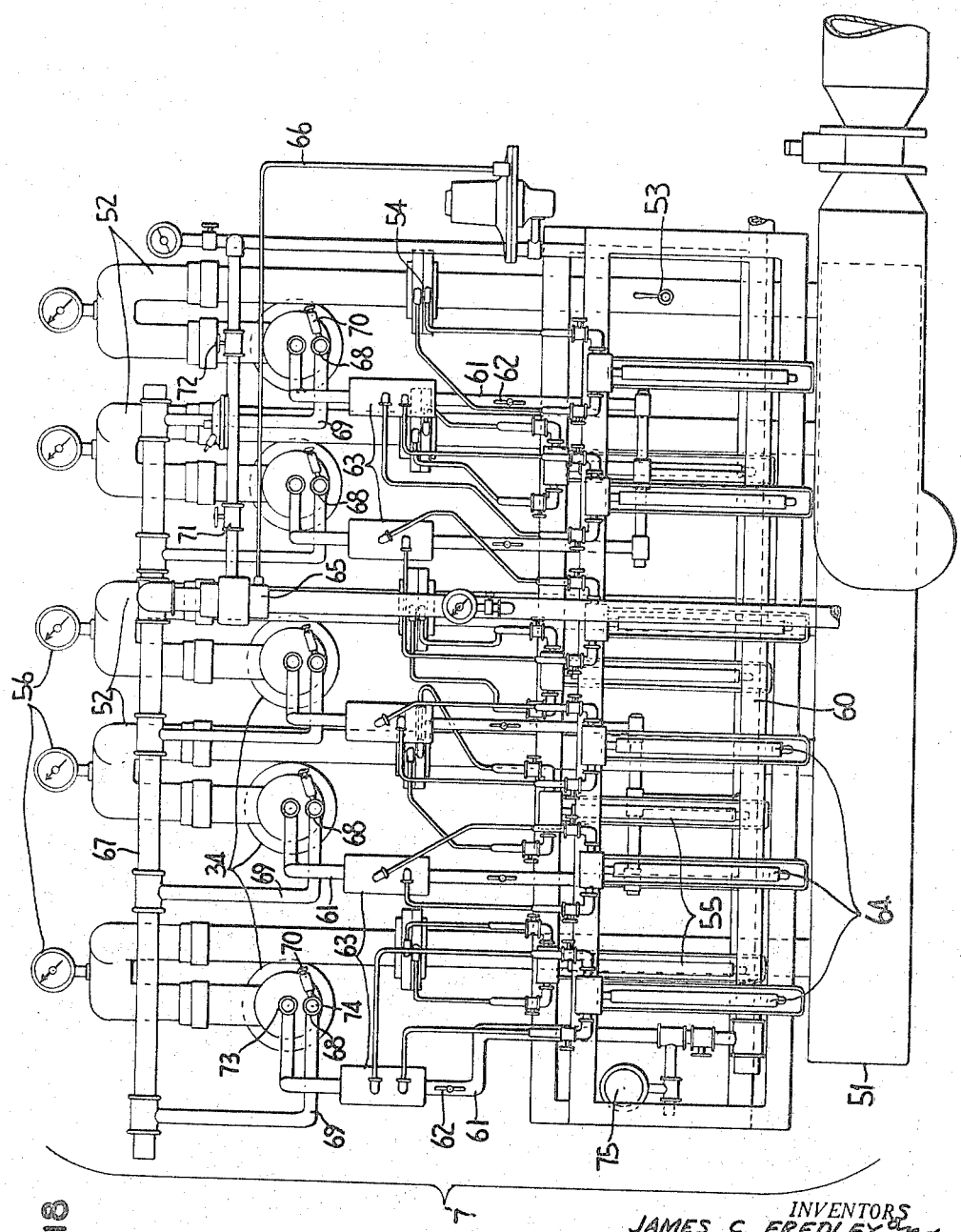

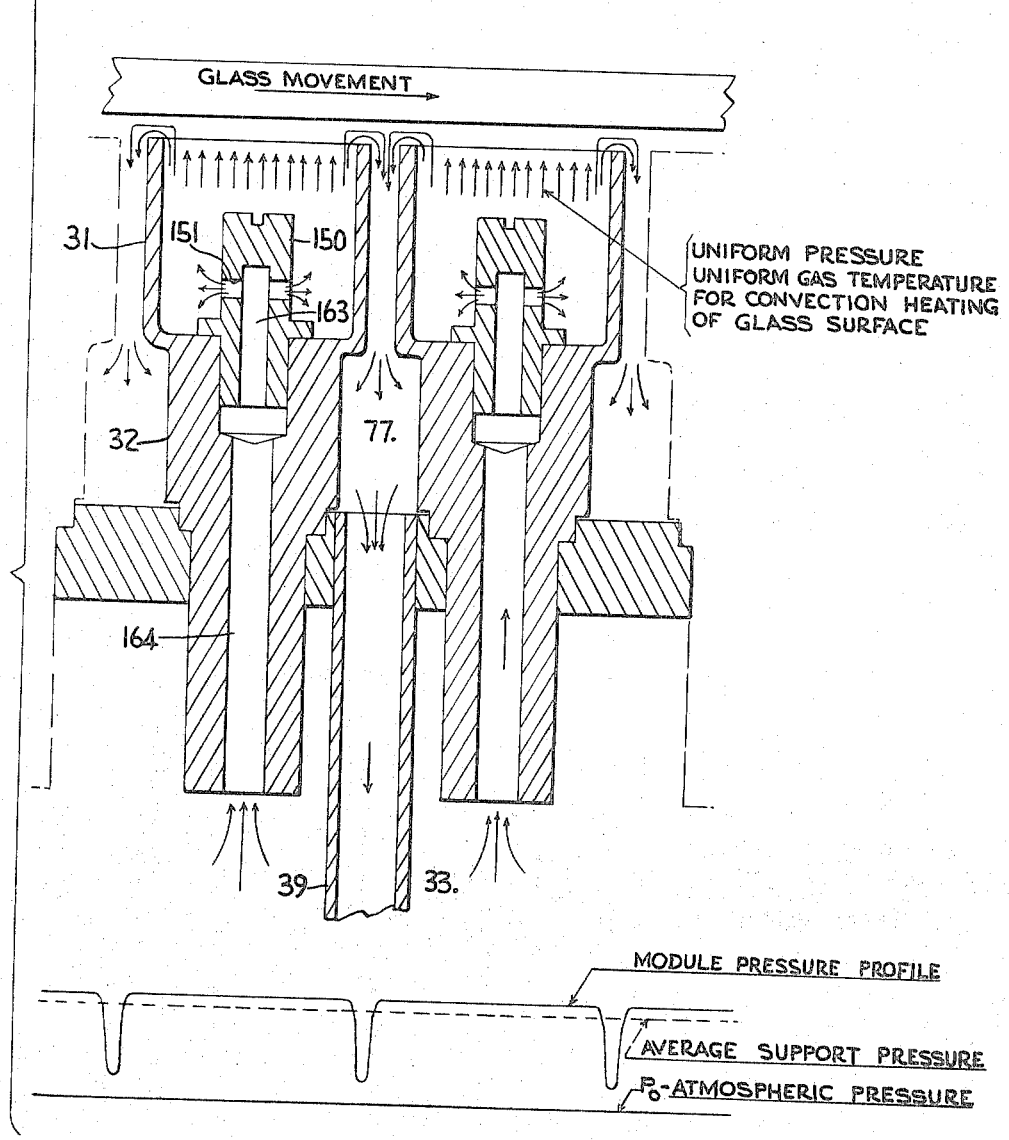

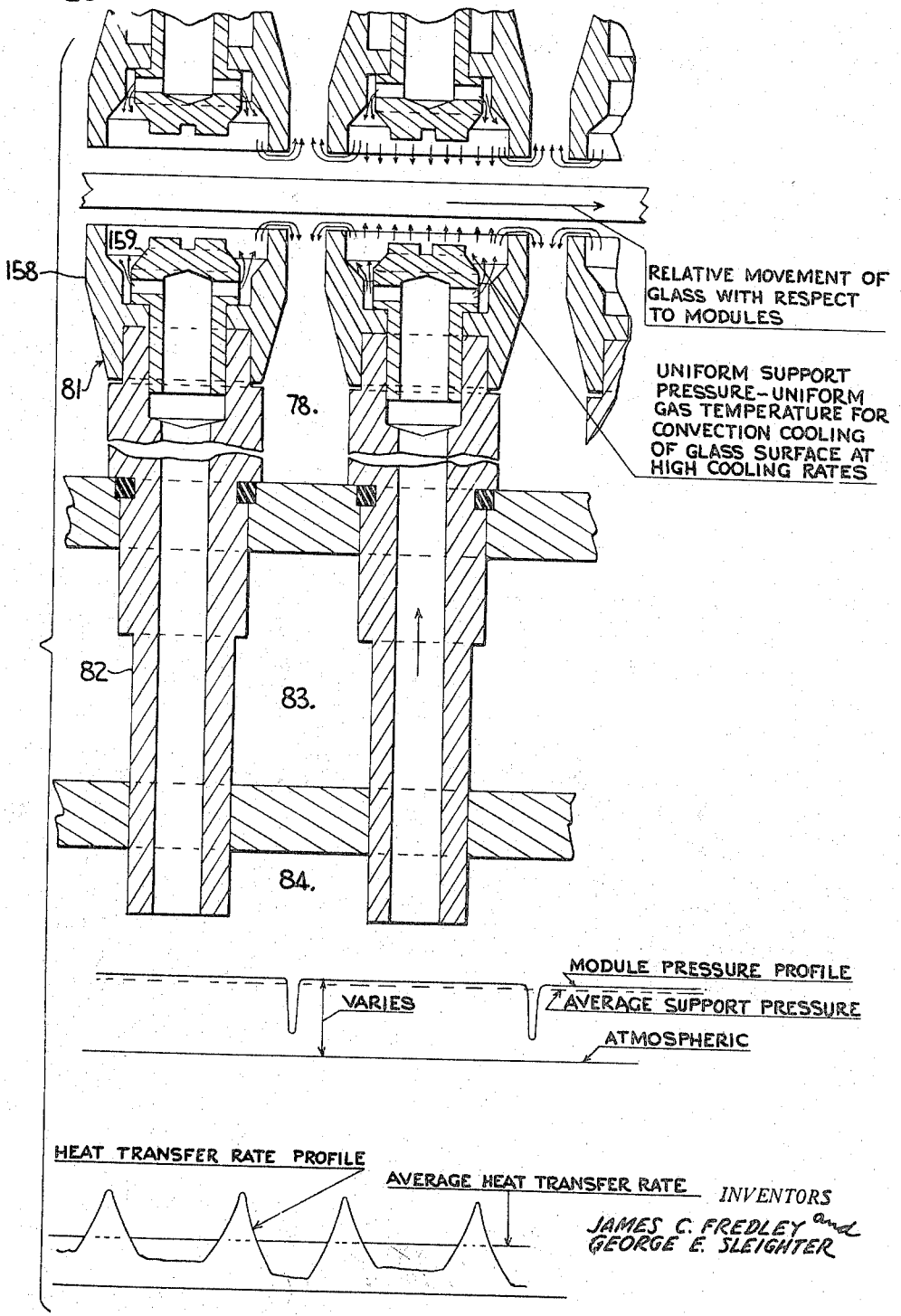

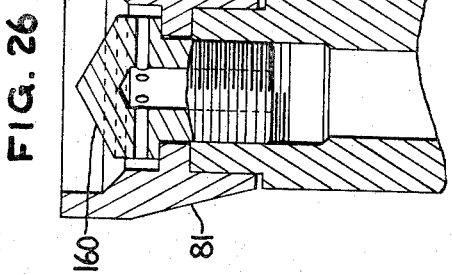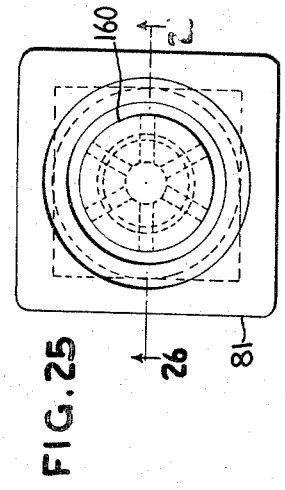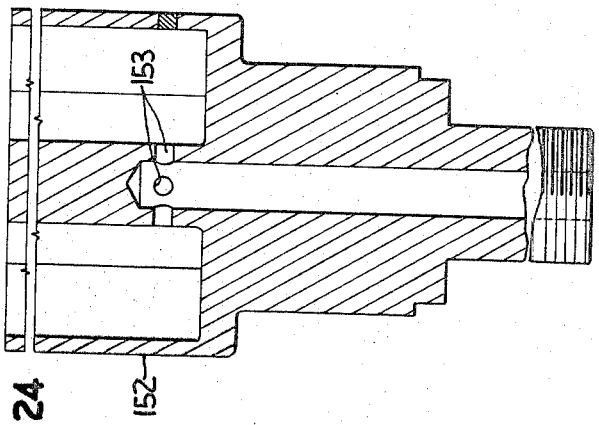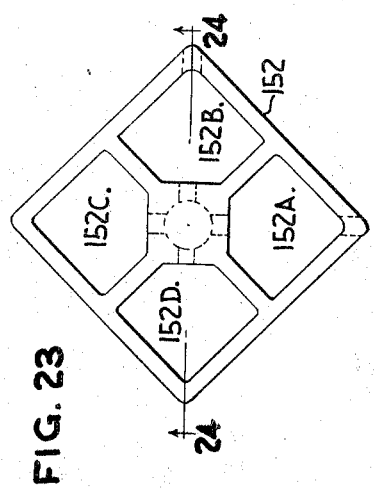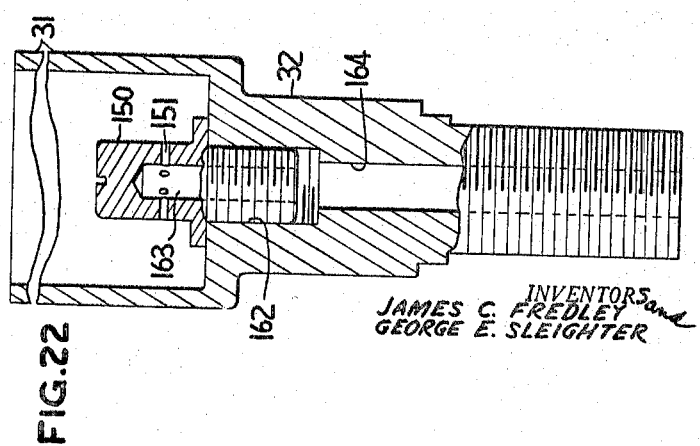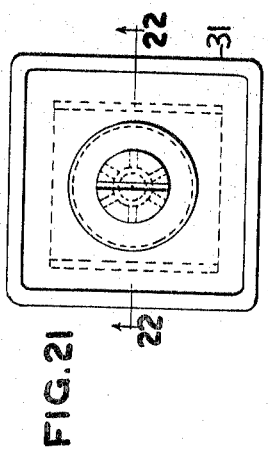

INVENTORS
JAMES C. FREDLEY and
GEORGE E. SLEIGHTER

INVENTORS
JAMES C. FREDLEY and
GEORGE E. SLEIGHTER

ABOUT THE PATENT

United States Patent Office 3,342,573
Patented Sept. 19, 1967

3,342,573
METHOD OF HEAT TREATING GLASS SHEETS ON A GASEOUS SUPPORT BED
James C. Fredley, Tarentum, and George E. Sleighter, Natrona, Heights, Pa., assignors to Pittsburgh Plate Glass Company, Pittsburgh, Pa., a corporation of Pennsylvania
Original application Nov. 9, 1962, Ser. No. 236,676, now Patent No. 3,223,501, dated Dec. 14, 1965. Divided and this application Dec. 13, 1965, Ser. No. 513,378
1 Claim. (Cl. 65—25)

This application is a division of our copending application, Ser. No. 236,676 now U.S. Patent 3,223,501, entitled "Fabrication of Glass," filed Nov. 9, 1962, which in turn was a continuation-in-part of our copending application Ser. No. 236,103, filed Nov. 7, 1962, now abandoned, which application is, in turn, a continuation-in-part of our copending application Ser. No. 209,456, filed July 12, 1962, now abandoned, which application is, in turn, a continuation-in-part of our copending application Ser. No. 185,757, filed Apr. 6, 1962, now abandoned, which application is, in turn, a continuation-in-part of our copending application Ser. No. 172,235, filed Feb. 9, 1962, now abandoned, which application is, in turn a continuation-in-part of our copending application Ser. No. 139,901, filed Sept. 22, 1961, now abandoned. Reference is also made to our copending applications Ser. No. 31,572, filed May 25, 1960, now abandoned; Ser. No. 139,902, filed Sept. 22, 1961, now abondoned; Ser. No.140,135, filed Sept. 22, 1961, now abandoned; Ser. No. 175,938, filed Feb. 27, 1962, now abandoned; Ser. No. 176,050, filed Feb. 27, 1962, now abandoned; Ser. No. 178,997, filed Mar. 12, 1962, now abandoned; Ser. No. 185,448, filed Apr. 5, 1962, now abandoned; and Ser. No. 195,773, filed May 18, 1962, all of which applications are directed to related subject matter. All of the aforesaid applications referred to herein pursuant to 35 U.S.C. 120 are assigned to the assignee of this application.

This invention relates to the fabrication of glass and more particularly to heating of glass and to the transportation and/or support of hot glass sheets, especially glass at a deformation temperature. It is particularly concerned with such a process when combined with other operations such as bending, tempering, annealing, flattening, or coating such sheets.

Sheets of glass may be fabricated through known manufacturing techniques of bending, tempering, annealing or coating and combinations of such techniques to form end products having characteristics and uses different from the original product. A common feature of these techniques is the heating of glass sheets to a temperature above that at which the major surfaces or the contour thereof will be changed by a deforming stress or contact with solids, hereinafter referred to as deformation temperature. For most plate and window glass this temperature is around 980 degrees Fahrenheit and above, but usually below a temperature at which the glass becomes molten.

Economic utilization of fabricating equipment requires that the glass sheets undergoing treatment be conveyed while hot.

The necessity of conveying glass at high temperature has heretofore resulted in undesirable deformation or marring of the major surfaces of glass sheets being treated due to physical contact with supporting and conveying apparatus while the glass is at elevated temperatures. The instant invention overcomes this defect common to the known methods of heat treating glass sheets. In addition, this invention overcomes further disadvantages peculiar to some of the individual fabricating techniques.

Included in the instant invention are new and useful methods and apparatus for supporting and conveying hot glass. More specifically, methods and apparatus have been devised for supporting and conveying a sheet of glass on a film of gas while the glass is at or above deformation temperature. The film of gas uniformly supports the glass against undesired deformation and eliminates the necessity of contact of the major surfaces of the glass sheet with any solid object while the glass is subject to deformation or impairment. In this manner, the marring or distorting now associated with current flat glass fabricating processes has been eliminated.

Classical bending of flat glass consists of heating the sheet while supported over a sand mold and allowing the glass to sag until it conforms to the mold. Such technique is obviously applicable only to custom jobs and does not lend itself to tempering. Small pieces of flat glass are even today bent on solid asbestos-covered convex molds, particularly in cases where the bends are spherical and the tolerance in surface quality is large. With the advent of curved auto and aircraft lights or windows, there is now demand for large volume production of curved sheet glass of high surface quality. Sometimes the glass is annealed and laminated, sometimes tempered, for safety purposes.

Fabricators of window and plate glass have utilized a variety of techniques heretofore for bending auto and aircraft glass. Simple bends have been produced by suspending flat parts with tongs, heating the glass above deformation temperature and applying bending moments by application of weighted wires urging the glass to conform to a predetermined simple curve, also by pressing the glass suspended by tongs with complementary male-female solid molds. Tongs mar the glass where they engage the surface, as do wires or the solid portions of presses.

Horizontal bending by gravity has been utilized, sheets of glass being mounted singly or in pairs across a "ring" mold or open affair in which only a small section of the major surface around the periphery of the glass being bent comes into contact with a mold surface and the glass is allowed to sag to shape under the influence of heat, sometimes aided by moments of force applied through movable mold sections. Because the chord of the curve produced is shorter than the same dimension on the flat pattern, there is relative movement between mold surface and glass while the glass is soft. This produces mold marks and scuff. Furthermore, the differential in heat capacity between the mold (usually metal) and the surrounding environment sets up differential stress patterns in the glass whether subsequently annealed or tempered and often produces visible distortion called "pie crust." Pie crust is a defect in the glass margins which appears to correspond roughly to the edge of the mold. Usually the glass is conveyed upon the mold during annealing or tempering until fabrication is complete. This requires a large complement of molds to achieve good production rates, another disadvantage.

In utilizing the instant invention for bending, the marring of the surface common to the prior art is overcome. Glass sheets are supported and conveyed over a gas film support while the sheets are heated to a temperature at which they can bend. Due to the substantial uniformity of support pressure provided by the gas film of the instant invention, the contour of the heated sheets may be maintained within close tolerances. By gradually changing the contour of the supporting gas film bed and conveying the heated sheets by edge contact or contact localized at the margins only, the contour of the sheets changes in travel to conform to the supporting force, resulting in sheets forward to a desired curvature. The curved sheets so produced may be either tempered or annealed subsequently, while retaining the established contour on the gas film.

In tempering flat sheets, the prior art uses one of three alternative means of support. In one, the glass is gripped near an upper margin by tongs and thus is suspended from a carriage riding on a conveyor which may move the glass from a vertical furnace either laterally or vertically to a position between adjacent blowers which quench or temper the glass. Alternatively, the glass may rest at the bottom edge on a mesh support carried by the conveyor and be held upright by fingers on each side of the upper edge. In a second alternative, flat glass is simply conveyed through a furnace and thence between horizontal blowers with the bottom major surface of the glass supported on rolls of small diameter closely centered so as to diminish the distance between lines of support.

The vertical processes leaves tong or finger marks and develop uneven stresses attributable to local heat transfer differentials in the vicinity of the mesh, fingers and tongs.

The roller process leaves roll marks, scuff marks, and other defects, in addition to which a certain degree of "wave" distortion is inevitably imparted to the sheet as a consequence of the glass undulating over the rolls as it softens in its travel.

In the instant invention, glass sheets, for example, flat sheets, to be tempered, are supported upon a film of gas exerting a substantially uniform pressure so as to support the sheets against deformation while they are heated to a deformation temperature. Such support can be so effectively achieved that even warped sheets can be flattened. The movement of the sheets along the gas support is controlled through physical means contacting only an edge or marginal portion thereof. After reaching the desired temperature, each sheet is moved between a supporting, relatively cold, flowing gas support and an opposing cold gas flow on the opposite major surface, both having sufficient flow and low temperature to establish the necessary thermal gradient between the surfaces and the interior, and is thus tempered without the marring or distortion characteristic of the prior art.

In addition to eliminating the foregoing disadvantages, the instant invention, through more efficient and uniform heat transfer, has substantially eliminated the irregular iridescent strain pattern characteristic of tempered glass and has provided a process for fully tempering thinner glass to produce products of higher quality than has been possible under existing production processes.

In known processes of annealing, glass exhibiting undesirably high internal stresses is conveyed on rollers through a lehr where it is reheated substantially to its upper annealing range to allow stresses to relax and is then cooled in a controlled manner through the lower limit of its annealing range. The nonuniform support and the unavoidable slippage between the rollers and the softened glass results in distortion and surface marring of the sheets. In the manner herein disclosed, glass may be reheated and annealed without the attendant disadvantages of the known processes. This is accomplished by supporting and conveying the heated sheets of glass along a gas film bed which provided uniform support without physical contact with the major surfaces of the glass.

Coated glass has myriad end uses. Many coatings require heat treatment during fabrication. For instance, in producing flat colored spandrels for architectural purposes, flat sheet glass is coated cold on one side with a frit or enamel and then "fired" to glaze the frit and bond it to the glass surface. Firing temperatures exceed the deformation temperature of the flat glass substrate. If produced on roller lehrs, wave, bow and other distortion results. If processed while suspended by tongs, tong marks ensue. Usually the product is chilled after firing to produce a semi-temper, or partial strengthening. Full temper within practical quality limitations is well nigh impossible of achievement with existing processes because of lack of control. The heat transfer rate on one side of the sheet differs from that on the other. Existing relatively crude quenching blowers do not permit the control necessary to match the quantum of heat transfer on opposite sides—a practical sine qua non for achieving full temper.

Likewise, there is a desideratum for higher temperature in firing because the durability of the coating is enhanced thereby. The prior art is limited in this regard because above about 1150 degrees Fahrenheit, tongs not only indent but more or less tear the glass along the points of contact, while in the roller system intolerable wave results.

The present invention overcomes all these defects. The coated sheet can be fired at higher temperatures without marring or distortion. It can be tempered to the degree desired by control of the rates of flow in the quenching section.

Again, a variety of useful end products are produced by spraying metallic salt solutions on hot glass. Transparent electroconductive tin oxide coatings are produced when a cold solution of a tin salt such as tin chloride is sprayed on hot glass. Transparent light and heat reflecting films are produced when solutions of cobalt and other metal salts are sprayed cold on hot glass. As in the case of enamels, the inadequacies of the prior art limit the temperature of sheet glass treatment below optimum temperatures desirable in achieving not only maximum durability but other functional attributes such as conductivity in conductive films. The glass is marred and distorted in treatment. These deficiencies are overcome in utilizing the present invention.

The broad concept of supporting and conveying sheet material on a film of gas is, of course, known and has been used in many industrial applications. These known methods and apparatus for supporting and conveying sheet material are, however, unsatisfactory for supporting a readily deformable visco-elastic material while the material approaches a deformation temperature. Because the known methods and apparatus are incapable of supporting a deformable visco-elastic sheet of material uniformly over substantially its entire area, their application to the support of glass sheets heated to a temperature at which they readily deform is precluded. Thus, the insufficiencies of design for the purposes herein intended of such a gas film support as disclosed in U.S. Patent No. 1,622,817 to Frederic B. Waldron result in an unacceptable distortion of any glass heated to the temperature at which it will readily deform when supported on a device of the nature disclosed therein.

Applicants have, through the use of the methods and apparatus disclosed herein which form the subject matter of this invention, overcome the above-discussed disadvantages of the known methods of treating, supporting and conveying glass.

In its broader aspects the present invention contemplates the provision of a support system adapted for handling hot glass, or other heat deformable material, in sheet or ribbon form without marring or otherwise producing uncontrolled deformation in the major surfaces, even when the glass or other material is at a deformation temperature.

In accordance with an embodiment of the invention, there is provided a plurality of evenly distributed zones of uniform nominal pressure on the lower side of the sheet adequate to support the sheet element undergoing treatment. Gas flows from a reservoir under higher pressure into such zones, being uniformly throttled between the reservoir and each zone to restrict the passage of gas between the two. Each zone constitutes a unit of support area with respect to the sheet to be supported and each has a reference surface at its margins common to the remainder. Within each zone, gas entering from the reservoir is diffused after throttling so as to avoid creation of localized jets normal to the reference surface and otherwise to equalize pressure and flow under normal conditions of operation. Provision is made for escape of the flow of gas emanating from each zone when covered by glass. In operation, the rate of flow of gas from the reservoir to each zone is maintained at such level that the average clearance between the reference surface and the glass sheet being supported is not less than 0.001 inch and not greater than 0.050 inch, normally not greater than 0.025 inch for glass having a thickness of 1/8 inch and above, and in any case never more than 50 to 90 percent of the thickness of the supported glass.

More particularly, the invention contemplates such a gas support system in which glass is introduced onto the support area at a temperature below that at which its major surfaces will mar on physical contact with solid objects, the glass is heated above deformation temperature while supported primarily by gas and is then cooled until below deformation temperature before removal from the gas support. The system is particularly well adapted to heating flat glass in the form of sheets or the like in which the thickness ranges up to 1/2 to one inch and the length and breadth of the sheet generally are over 6 inches or one foot to as much as 5 or 10 feet or greater, optionally bending it by travel over a curved bed, then rapidly cooling the surfaces or quenching by utilizing relatively cold gas as the support medium, supplementing the cooling effect on the supported side by complementary flow of cold gas against the opposite side to equalize the heat transfer from the two major surfaces until the entire body is cool enough to prevent loss of temper or, in other words, redistribution of the stress differential set up between the surfaces and the interior of the glass body by differential rates of cooling.

Advantageously, heating of glass upon the gas support is accomplished by burning a controlled admixture of gas and air, introducing the hot products of combustion to the reservoir or plenum chamber which supplies the supporting zones, and supplementing the heat thus supplied to the glass by radiant heat from an independently controlled source or sources which are generally disposed on the side of the glass oppoiste the supported side.

The attendant advantages of this invention and the various embodiments thereof will be readily appreciated as the same become better understood by reference to the following detailed description when considered in connection with the accompanying drawings in which:

FIG. 1 is a perspective, partly schematic, view illustrating a system for conveying, heating and quenching sheet glass parts embodying several features of the present invention; FIG. 1A is another partly schematic perspective on a larger scale illustrating particularly how sheet glass parts are driven by discs contacting an edge of the part while it is otherwise supported entirely by a gas film over the inclined bed of FIG. 1;

FIG. 8 is a schematic view showing the arrangements for supplying air and cooling water to the quenching heads;

FIG. 9 is an approximately full scale sectional detail illustrating elements of quenching module design and patterns of air flow during operation;

FIG. 10 is a sectional detail showing the arrangement for supplying air to those quenching modules in the row next adjacent to the heating section;

FIG. 11 is a partially detailed plan view of the first and second beds in the gas support heating section showing the relationship of the individual modules in the geometry of the mosaic;

FIG. 12 is a sectional view taken along line 12—12 of FIG. 11, showing the relationship of the modules and exhaust ducts to the bed plate and plenum chamber;

FIG. 13 is an enlarged partial plan view of the lower quenching bed of FIG. 4;

FIG. 14 shows the arrangement used to vary the speed of the conveyor drive during the run out of parts from the heating to the quenching section;

FIG. 15 is a perspective view showing a gas film support bed, the generative surface of which progressively changes in contour from flat to a cylindrical shape in a cross section normal to the longitudinal axis of the bed;

FIG. 16 is an end elevation of the bed of FIG. 15 looking toward the part of maximum curvature;

FIG. 17 is a side elevation of the bed of FIG. 15 showing how the curve is developed along the path of travel of the glass;

FIG. 18 is an elevation of the burners, gas and air feeds and controls for one of the three plenum chambers of the gas support heating section;

FIG. 19 is a schematic view on enlarged scale of a section of the gas support bed showing diagrammatically the flow and exhaust of the support gases and presenting diagrammatic graphs in conjunction therewith;

FIG. 20 is a view similar to FIG. 19, presenting diagrammatic graphs and flows in conjunction with the quenching system;

FIG. 21 is a plan view approximately double scale illustrating a prototype support module unit;

FIG. 22 is a section taken along the line 22—22 of FIG. 21;

FIG. 23 is a plan view double scale of an improved support module unit, simpler of fabrication and in which the support area is subdivided by partitions;

FIG. 24 is a section taken along lines 24—24 of FIG. 23;

FIG. 25 is a plan view approximately double scale of a typical quenching module unit;

FIG. 26 is a section taken along lines 26—26 of FIG. 25;

Figure 1:
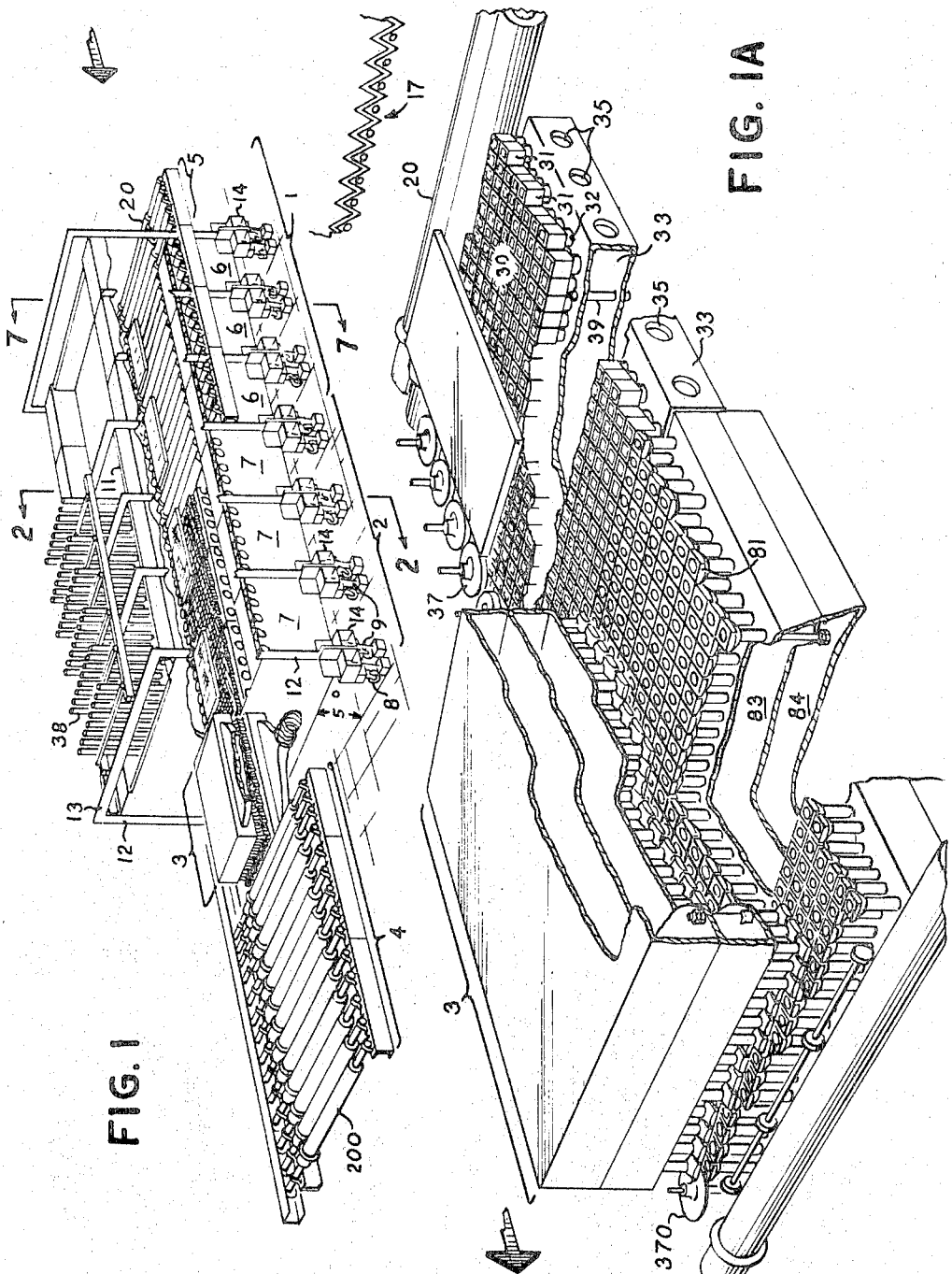
Figure 2:
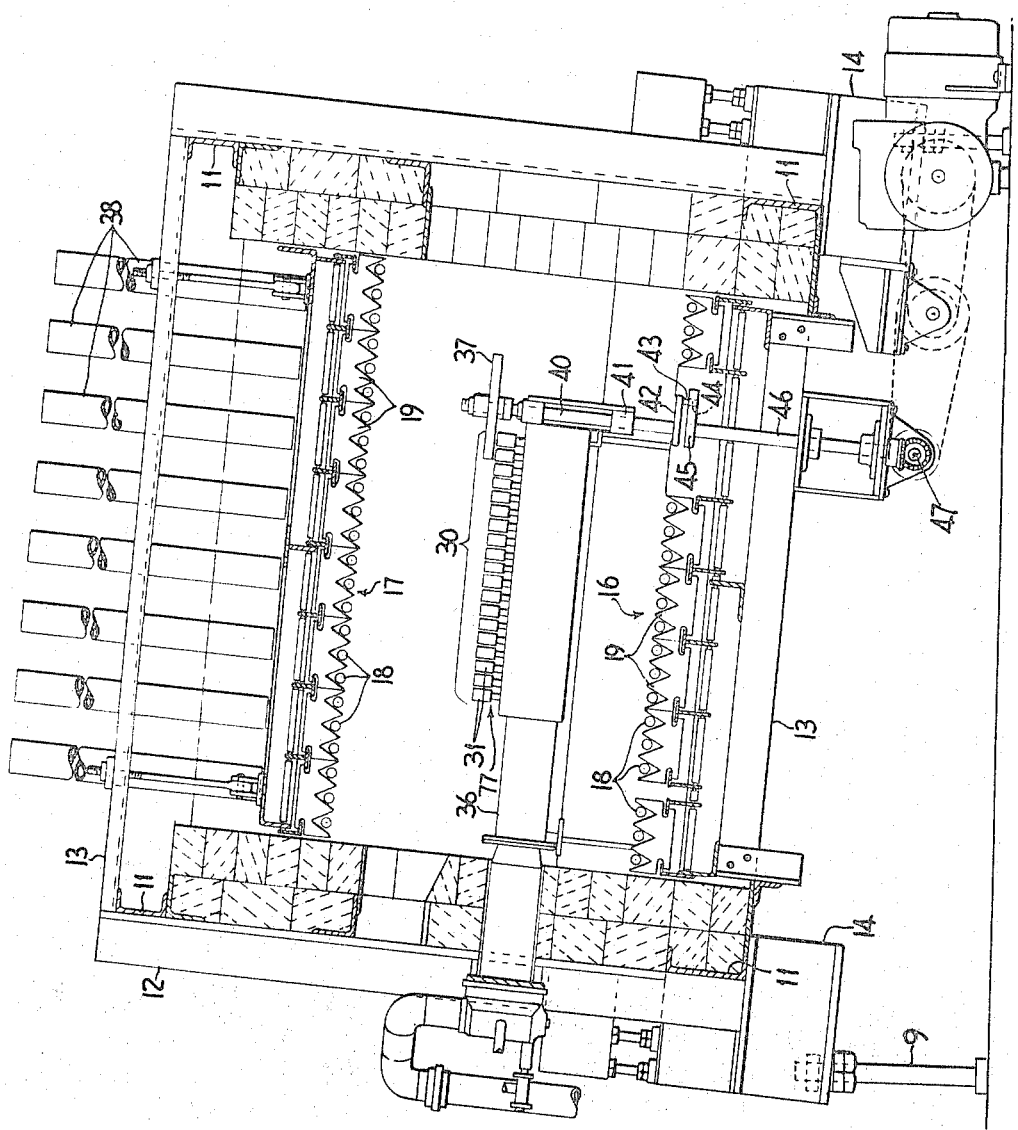
FIG. 2 is a detailed view partly in section and partly in elevation taken along the line 2—2 of FIG. 1.

Referring to the drawings, FIG. 1 illustrates a system advantageously employed for heating flat glass parts up to or above the deformation temperature, e.g., to a temperature at which the glass can be tempered, quenching such parts while hot and delivering the parts thus tempered onto a roll conveyor for removal. The component sections making up the complete system consist of a preheat section 1 wherein the glass is conveyed on rollers between radiant heaters to preheat the glass until brought to a suitable preheat temperature under the deformation temperature; a gas film support heating section 2, where the glass parts are transferred to, and supported on, a film of hot gas while being conveyed through a frictional drive contacting the edges only of such parts, supplemental heat being supplied by radiant heat sources above and below the glass until the glass reaches a temperature high enough for tempering purposes; a quenching section 3, where the glass is rapidly chilled while suspended between opposed flowing films of cool air, edge contact driving being continued through the section, and a delivery roll system 4 which receives the tempered glass parts from the quenching system and conveys them to their next destination.

Preheat section 1 includes an apron roll unit 5 for loading, the first few rolls being idle and the last driven. Next in order of the direction of travel of the workpiece are three identical enclosed preheat units 6 followed by three enclosed hot gas support heating units 7, the quenching section 3 and the delivery section 4.

For ease in fabrication, all units 5, 6, 7 and sections 3 and 4 are assembled within rectilinear frameworks of support and mounted on casters 8 for convenience in assembly. Each unit and section is elevated from the casters 8 by jacks 9 into a position with the surfaces of all rolls and the gas support beds in a common plane tilted in a sidewise direction at an angle of five degrees with respect to the horizon as shown in FIGS. 1, 2, 6 and 7. The essential framework consists of girders 11, stanchions 12, and beams 13 resting on support blocks 14.

THE PREHEAT SECTION

Each unit 6 of the preheat section includes a radiant floor 16 and a radiant roof 17 built up from individual electrical heating units consisting of heating coils 18 disposed in ceramic holders 19. Control is afforded so that each unit 6 may be regulated as to temperature across the path of travel and parallel thereto. Each unit is provided with a thermocouple (not shown) to sense the temperature of the unit and the glass and to actuate the unit to the extent necessary to supply the required amount of heat. Conveyor rolls 20 are provided with guide collars 21 in alignment throughout the section 1 so as to position the glass properly for transfer to the gas support next following. Each roll is journaled in bearings 22 and is driven through gears 23 from a common shaft 24 energized by drive motor 25. Temperature sensing devices 26 (FIG. 7) placed at intervals along the path of travel of the workpiece afford data from which to establish control.

GAS FILM SUPPORT HEATING SECTION

Figure 3:
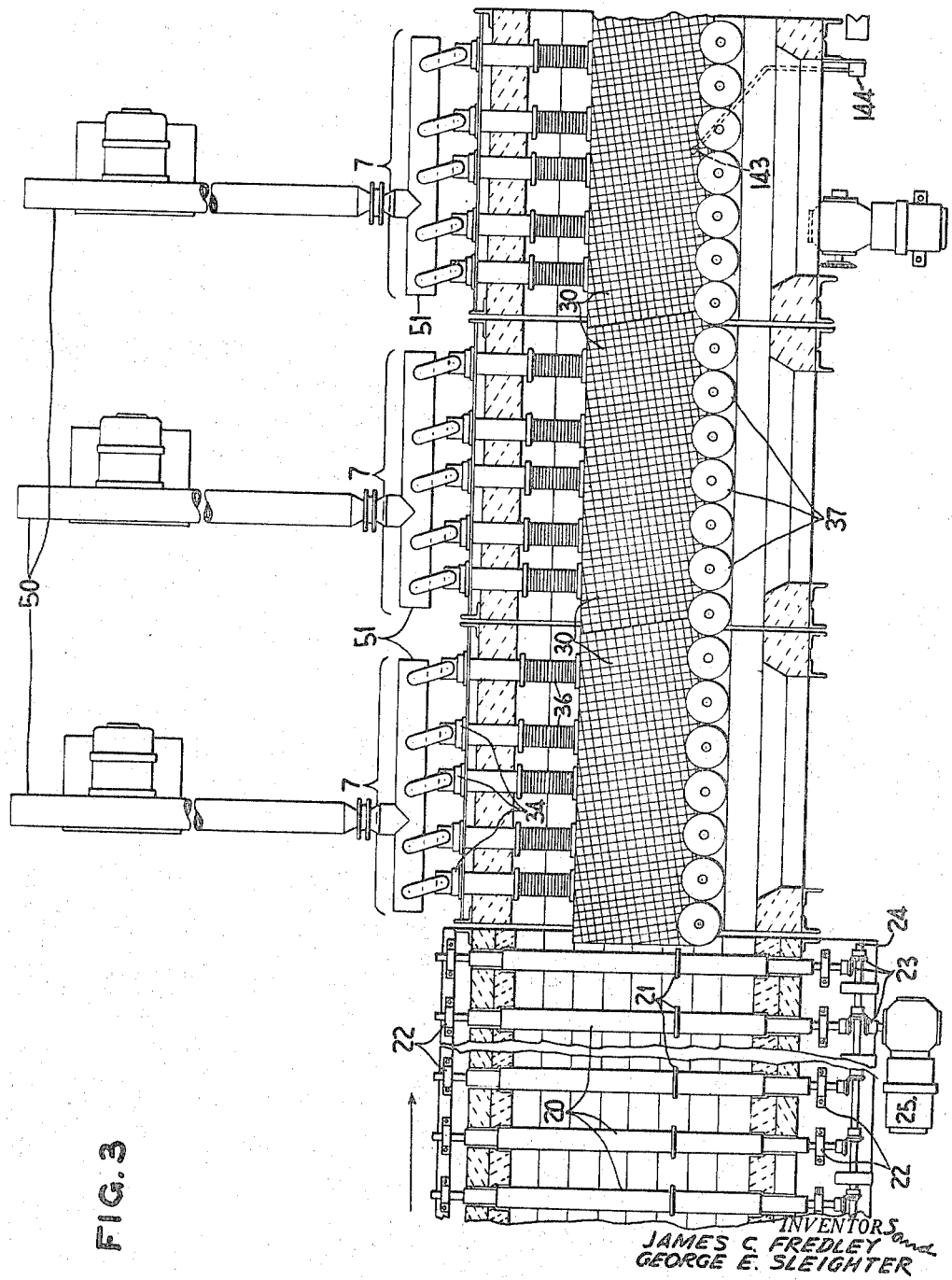
FIG. 3 is a partial plan view showing the arrangement of the preheat section with respect to gas film support heating section, the relative positions of the burners feeding combustion gases to the plenum chambers and the mechanism for conveying glass sheets by edge contact only.

As reflected in FIGS. 1 and 3, the gas film support heating section 2 is made up of three similar contiguous units 7, each fabricated within a supporting framework like the preheating units 6 and each having generally similar radiant floor 16 and roof 17 sections with heating coil units 18 susceptible of control by thermocouples in increments across and lengthwise of each unit.

As shown generally in FIGS. 1-A, 2, 3 and 4, each unit 7 includes a flat bed 30 of modules 31 in spaced but close juxtaposition each to the other and arranged geometrically like a mosaic. In the embodiment illustrated, all modules 31 have their upper termini of rectangular configuration and lying in a common plane. The modules 31 are arranged in successive rows, crossing the intended path of travel of the workpiece, each row being at an angle other than 90 degrees from the path and spaced close to the next adjacent row as hereinafter described in more detail.

Each module 31 has a stem 32 of smaller cross sectional area than the upper terminus and each opens into a plenum chamber 33 positioned below the bed 30 and acting as a support therefor. See FIG. 12. Each module is substantially enclosed and separated from other modules by an exhaust zone. The bed is adjusted to such level that the plane of the upper termini of the modules lies parallel to, but just below by approximately the height of the gap between the modules and the support height of the glass sheet, the plane defined by the upper surfaces of the conveying rolls 20 in a preheat section 6. At one side each plenum chamber 33 is in communication with five gas burners 34 through orifices 35 and flexible couplings 36. At the opposite and lower side of the bed 30 a series of uniform disk-like driving members 37 extend inwardly and just above the bed to frictionally engage one edge only of the workpiece and convey it along the bed in continuous straight line travel. A plurality of vents 38 project through the roof of each unit 7 to exhaust the interior to the atmosphere. Spaced intermittently in the bed 30 inboard of its margins are exhaust ducts 39 projecting through the floor of the plenum chamber 33 and communicating with the surrounding atmosphere in the furnace chamber thus serving to reduce the likelihood of pressure build-up in the central spaces between the modules 31 during the time when a workpiece overlies any substantial area of the bed. In addition, an exhaust channel 77 surrounding the module stems and disposed between the modules and the plenums provides exhaust paths to the sides of the module beds and hence to the surrounding atmosphere. Driving members 37 (FIG. 2) are mounted on shafts 40, journals 41 for which are supported by the supports for the plenum chambers. Each shaft 40 is driven through a coupling consisting of a crank arm 42 and pin 43, engaged by a slot 44 in cam 45, in turn rotated on shaft 46 which, except for the last three shafts 40 closest to the quenching section, is geared to drive shaft 47.

To supply air under pressure to the hot gas support combustion system, each unit 7 (FIG. 3) employs a blower 50 feeding air under pressure through a butterfly control to a manifold 51. As best shown in FIG. 18, the individual burners 34 are supplied with air from the manifold through conduits 52, each provided with a valve 53 and an orifice at 54 of known size. Pressure drop across each orifice can be measured by manometers 55 affording means to determine individual flow rates. Pressures gauges 56 permit balancing of static pressures in the air flowing to the burners.

Gas from main 60 is introduced into each burner 34 via conduits 61 each individually valved as at 62 and provided with flow metering devices 63 connected to manometers 64.

Each burner 34 is of the so-called direct fired air heater type. Air from blower 50 is tapped into premixer 65 and there mingled with gas supplied through pipe 66 from the main 60 from whence the mixture flows to a manifold 67 connected to burner pilots 68 by inlets 69. Each pilot 68 is provided with a continuous type spark plug 70 for ignition and safety against blowouts in addition to which each burner contains a glow tube (not shown) which remains incandescent during operation to sustain flame within the burner. Gas to the pilot premixer is controlled through needle-valve 71 and shut-off valve 72. Sight ports 73 and 74 permit visual independent inspection of the pilot flame and main flame, respectively, in each burner. Diaphragm type safety devices 75 act to shut off all gas and air in the event of loss of either gas or air supply pressure.

The combustion of the products in the combustion chamber produces sufficient plenum pressure to supply the modules with heated gas of a uniform temperature and pressure. Adequate control of pressure and temperature are provided by correlating the rates of input of air and fuel to the burners. To supply enough gas to effect the desired support under normal conditions, an excess of air (usually 50 percent or more in excess) over that required for the combustion of the fuel gas is used. The supply of gas may be varied to change the heat input and the supply of air may be varied to change the pressure in the plenum.

The modules and plenum chamber are in most cases made of metal, such as iron, or like material having high heat conductivity and the modules themselves are in good heat conductive relationship to the plenum chamber, being connected thereto.

FIGS. 15–17 show a module bed 76 of a curved rather than a flat contour for use in bending glass while it is supported on an air film. The heights of the modules 31 from the plenum chamber 33 are selectively and progressively changed, both in the direction of glass travel and in a direction transversely thereto by reducing the depth of the module cavities in varying degrees to gradually change the surface defined by the upper termini of the modules from flat to curved. Because each module supports the overlying portion of the glass at a uniform distance from its terminus, the deformable glass will bend as it progresses, conforming to the shape of the bed.

QUENCHING SECTION

Next adjacent the gas support heating section 2 in the direction of travel of the workpiece is quenching section 3. Separating the two is a partition 79 of asbestos board or the like for the purpose of segregating, as far as possible, the hot environment of heating section 2 from the cool environment of quenching section 2. An opening, not shown, in partition 79 is provided of such size and shape as to permit transfer of the workpiece from heating section 2 to quenching section 3 with minimum transfer of heat between the two sections.

As shown in FIGS. 1-A, 5 and 6, the quenching section 3 includes a flat bed of modules 80 arranged in mosaic pattern similar to that of the gas film support heating bed, but varying therefrom in certain respects hereinafter explained in detail. Each module 81 has a long stem 82 smaller in cross section than the upper terminus which projects through a cooling box 83 into a plenum 84, the cooling box and upper surface of the plenum acting as a support for the modules (see FIGS. 6 and 20). The surface of the upper termini of the modules is adjusted to such level that it loes at the same level and in the same contour as that of the end portion of the gas film heating bed next preceding.

Heat exchange fluid, such as cooling water, from inlet manifold 85 is introduced into the heat exchange box 83 through a plurality of pipes 86 and discharged through pipes 87 into an outlet manifold 88. The cooling box 83 is partitioned by walls 76 as shown in FIG. 13 to provide smaller compartments and thus a higher rate of heat exchange at the end of the section receiving hot glass than at the discharge end of the section. Relatively cool gas, such as air at ambient temperature is supplied to the plenum via blower 89, valve 90 and duct 81. See, e.g., FIGS. 6 and 8.

Figure 5:
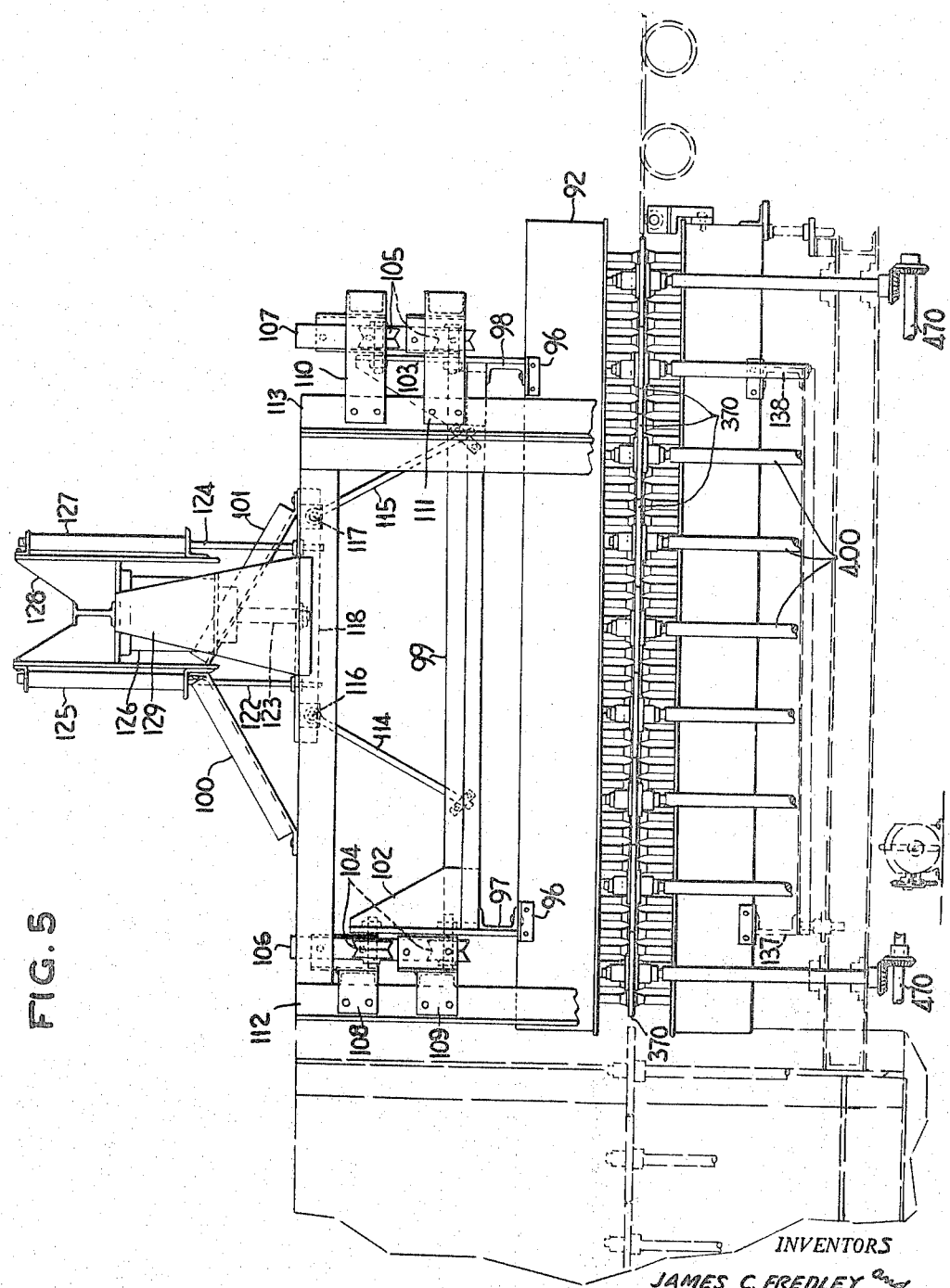
FIG. 5 is a side elevation of the quenching system showing the relationship of the upper and lower heads.
Figure 6:
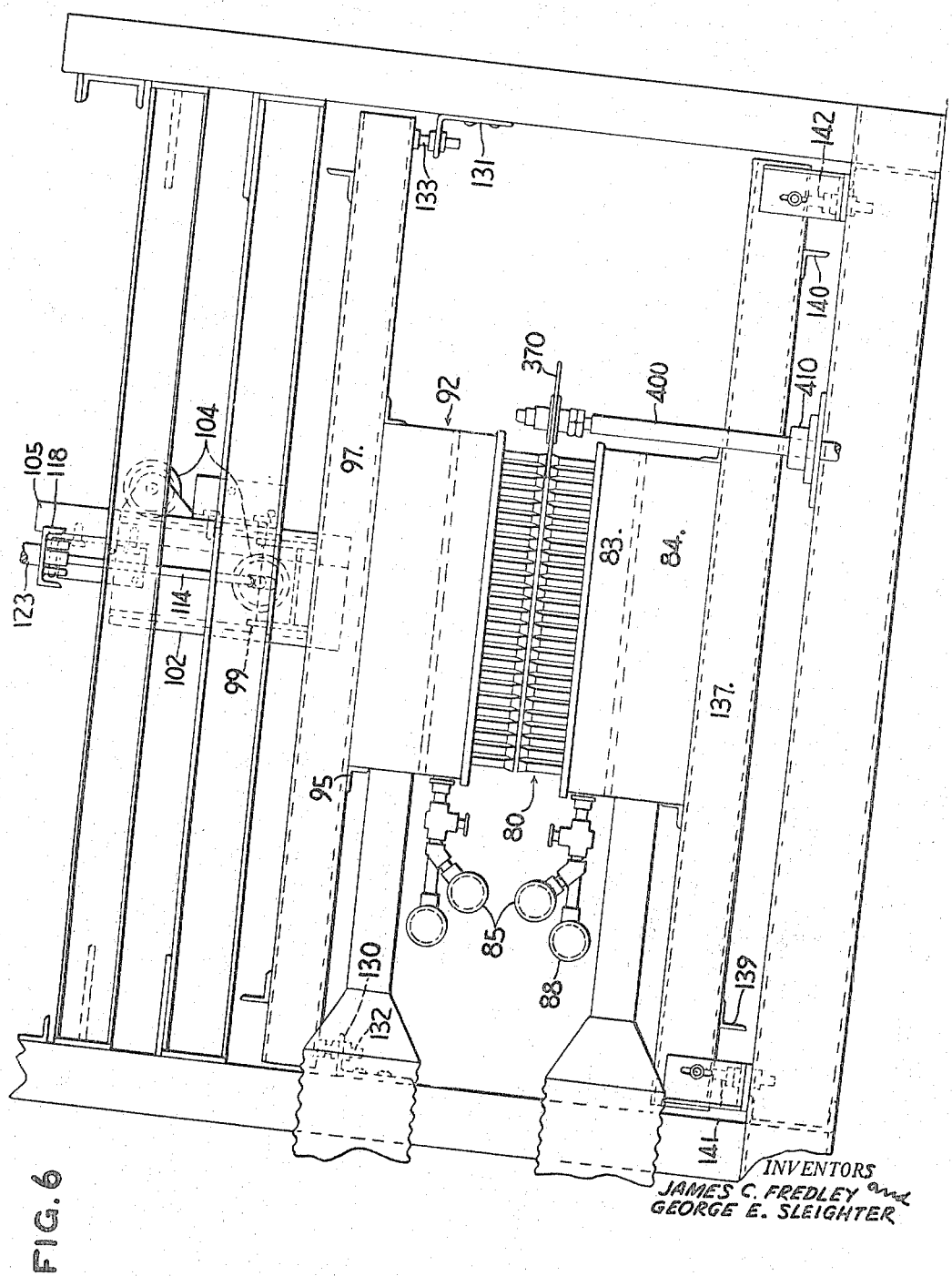
FIG. 6 is an end elevation of the system of FIG. 5.
Figure 7:
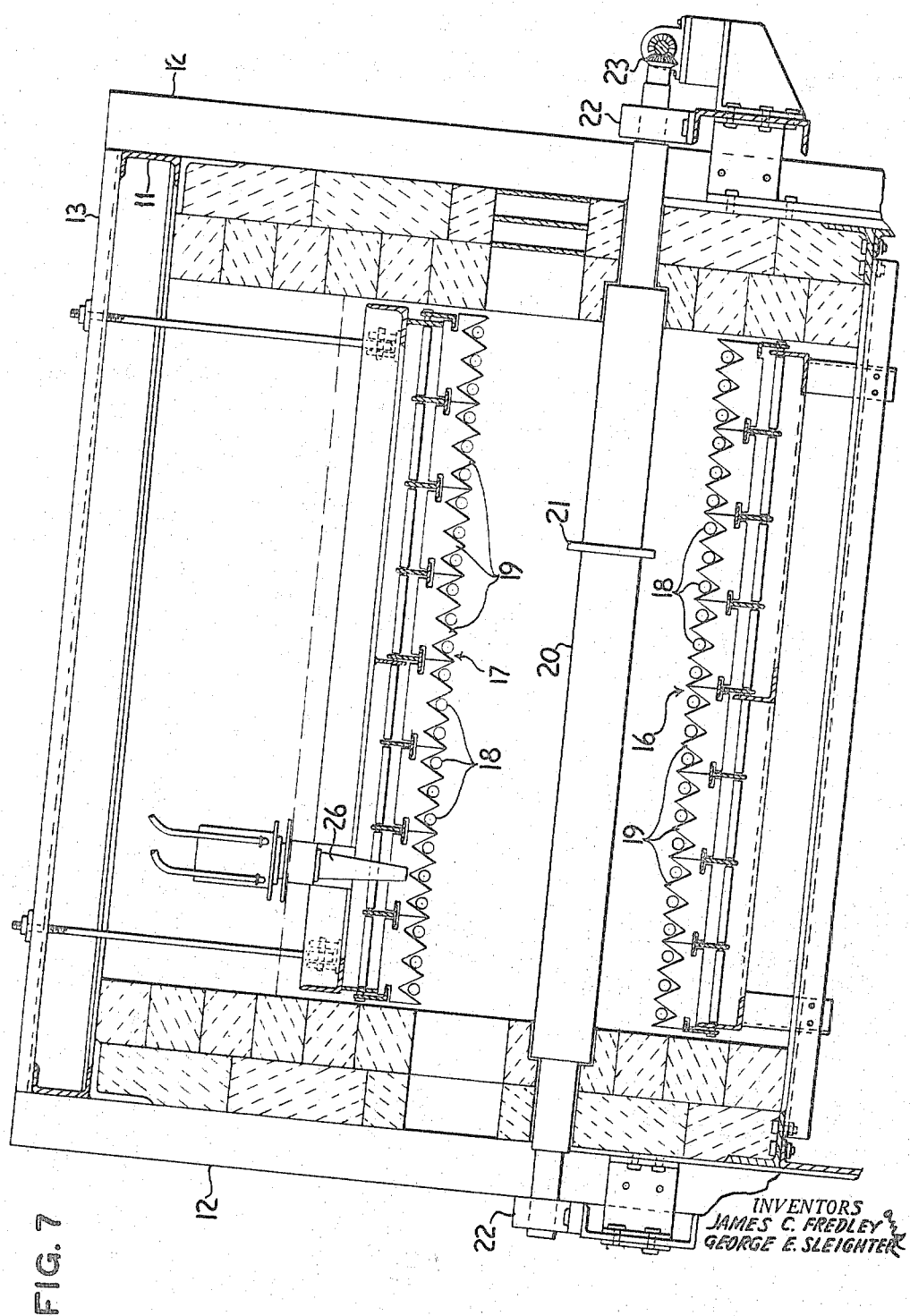
FIG. 7 is a sectional view partly in elevation taken along the line 7—7 of FIG. 1.

Above the bed 80 and supported in such fashion as to be capable of being raised and lowered is a head assembly 92 (FIGS. 5 and 6) which, in essence, constitutes a mirror image of the bed 80 and its associated heat exchange box 83 and plenum chamber 84 and which, in turn, is supplied separately with heat exchange fluid and air in like manner. The upper head assembly is rigidly fixed, as by welded angle irons 95 and 96, to two cross bars or channels 97 and 98, in turn fixed to a beam 99 and braced, as at 100 and 101.

At each evtremity of beam 99 an upright flange 102 and 103 carries two guide rollers 104 and 105, respectively, offset with respect to the axis of guideways 106 and 107. Guideways 106 and 107 are fixed in an upright position and carried by flanges 108, 109 and 110, 111 attached to cross members 112 and 113 of the supporting framework.

Stirrups 114 and 115, preferably of cable, are looped over pins 116 and 117 carried by a saddle 118 and at the lower end are attached to beam 99. Saddle 118 is suspended from three piston rods 122, 123 and 124 actuated by pneumatic lifting cylinder 126 and two hydraulic check cylinders 125 and 127. The three cylinders are carried on a trestle 128 supported above the main framework by a bridge 129. In lower or working position, head assembly 92 rests on brackets 130, 131 on the framework adjustable stop members 132 and 133 providing means to level the head and adjust its height with respect to the line of glass travel. Introduction of air to cylinder 126 by valve means, not shown, serves to raise the head assembly 92 to the upper limit of travel of pistons 122, 123 and 124, thus permitting access to the modules for cleaning, adjustment and the like.

Bed assembly 80 is carried by cross bars 137, 138 braced as at 139 and 140. At each of the four corners the framework thus formed rests on adjustable supports such as shown at 141 and 142 for leveling and height adjustment.

To bridge the gap necessarily existing at the juncture between the last plenum of the heating zone and the plenum of the quenching zone, a row of specially constructed quenching modules, as shown in FIG. 10, is used. This arrangement is necessitated by the readily deformable condition of the glass during this portion of the process, which condition requires the presence of continuous and uniform support. Such support is provided by the dual module 93 integrally formed and having both module cavities supplied from a common stem 94.

Figure 4:
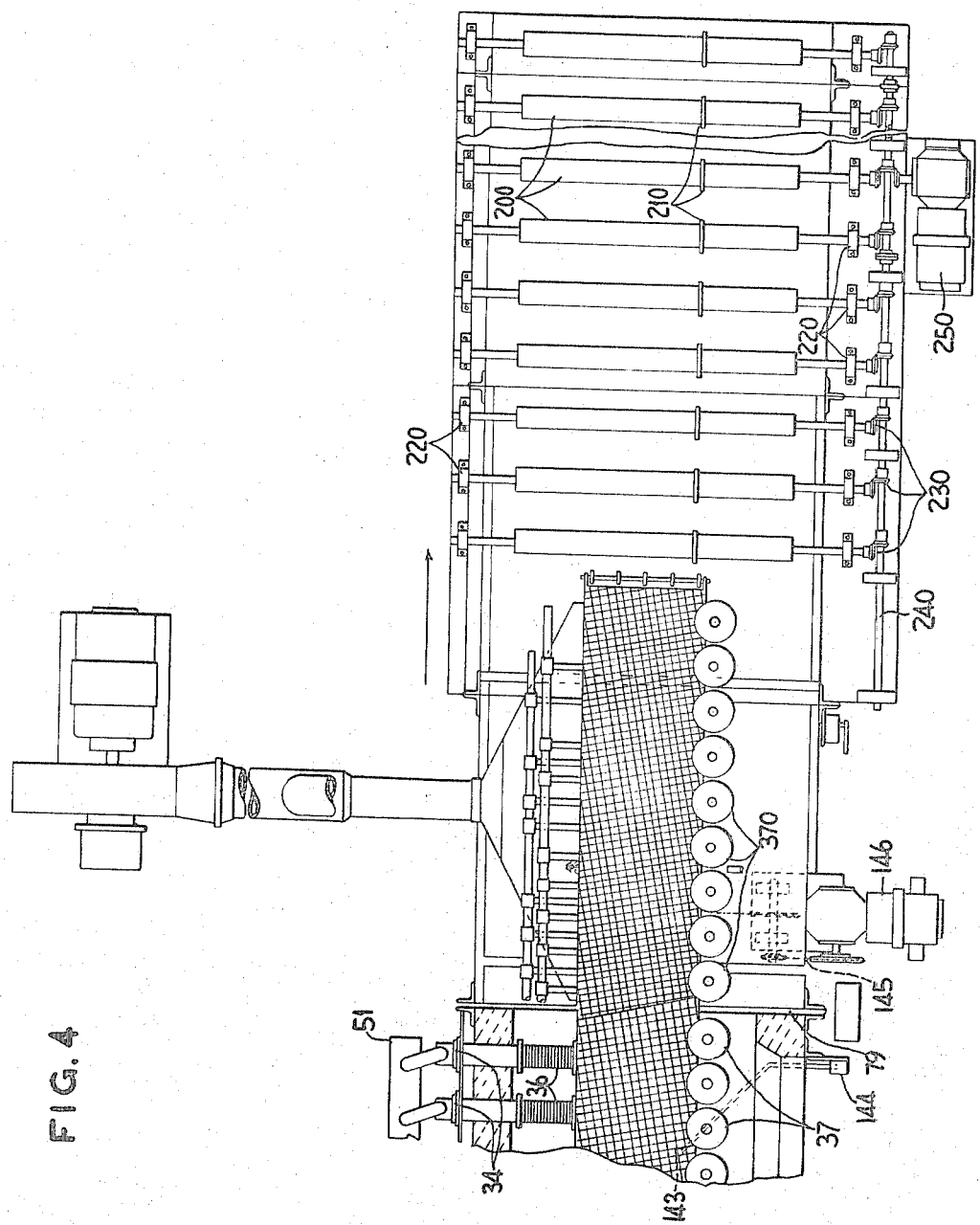
FIG. 4 is a partial plan view which is in effect a continuation of FIG. 3 and shows the terminus of the gas film support heating section adjacent the quenching section, the latter being followed by the conveyor roll run out sections.

The conveying means for the quenching system includes disk-like driving members 370 having a sufficiently narrow peripheral edge to extend inwardly and between the upper and lower module beds to frictionally engage one edge only of the workpiece and convey it along the bed in continuous straight line travel. Driving members 370 are mounted on shafts 400, journals 410 for which are supported by the supports for the lower bed. Each shaft 400 and the last three shafts 40 closest to the quenching section are geared to and driven by drive shaft 470 which is driven at normal speed by motor 147 or at high speed by motor 146. See FIGS. 4 and 14.

Drive shaft 470 is separated from drive shaft 47 by electrically operated clutch 58. Normal speed drive motor 147 is connected to drive shaft 47 by chain drive 148, and high speed drive motor 146 is connected to drive shaft 470 by chain drive 145. A clutch (not shown) is interposed between the power take-off of high speed motor 146 and the chain drive 145 to shaft 470 to allow continuous operation of the motor and selective high speed drive or drive shaft 470 when clutch 58 is disengaged.

Positioned at the corner of one module near the end of the heating section is a pressure sensing element 143 (FIGS. 3 and 4) which is sensitive to the presence of a glass sheet and which operates a micro-switch 144 connected to a time-operated control mechanism (not shown). This mechanism controls clutch 58 and the clutch which is interposed between the power take-off of high speed motor 146 and the chain drive 145 and functions, after a preselected time interval, to disconnect the drive of the last three disks 37 and all disks 370 of the quenching section from shaft 47, and to connect motor 146 to chain drive 145. This provides a rapid drive for said disks to quickly transfer the glass sheet sensed by element 143 from the heating section to the quenching section. The timing mechanism then switches the drive of all disks 37 and 370 back to normal speed motor 147.

A photocell 57 for receiving light passing edgewise through the width of the glass being conveyed between the quenching beds is mounted adjacent one side of the quenching section. A light source 59 is mounted on the other side of the quenching section opposite the photocell. The photocell is electrically connected to the said control mechanism and, upon sensing a break, deactivates clutch 58 and activates the clutch interposed between the power take-off of high speed motor 146 and the chain drive 145 to rapidly convey the broken glass sheet out of the quenching section.

When a curved module bed is used in the heating section, the upper and lower module beds of the quenching section are formed to curvatures corresponding to the final curvature imparted to the glass in the heating section.

DELIVERY SECTION

As shown in FIG. 1, the delivery roll section 4 consists of conveyor rolls 200 provided with guide collars 210 in alignment with disks 370 of the quench section to maintain the proper position of the glass during transfer therefrom. Each roll is journaled in bearings 220 and is driven through gears 230 from a common shaft 240 energized by drive motor 250.

MODULE DESIGN

In accordance with an embodiment of this invention, highly developed and refined supporting apparatus have been provided to prevent the distortion of glass at deformation temperature, an important achievement not accomplished by known conveying apparatus and processes, including known air film support devices. Specifically, it is important to have a very large proportion of the glass sheet or plate supported by a uniform force. This prohibits flowing the supporting air film across substantial areas of a supporting plate (i.e., between such a plate and the supported glass) because of the creation thereby of a progressive pressure drop along the path of flow and, hence, a nonuniform supporting force. Furthermore, air introduced from a plurality of points beneath the supported glass must be exhausted beneath the supported area rather than merely by lateral flow to the glass edges to prevent a pressure build-up centrally of the supported sheet that will cause a doming effect upon the soft glass. The gas, having exhausted to points below the modules and adjacent the stems thereof, then flows principally to the sides of the bed through the exhaust channel 77 underneath the modules, some portion of the gas exhausting through ducts 39. This channel 77 is disposed underneath the modules, the module stems 32 which extend therethrough being long enough to provide adequate height to this space.

Of course, if the support zones are small in comparison with the exhaust areas, the support pressure will not be substantially uniform. If the exhaust areas are large in magnitude, thinner sheets of glass overlying these areas will have a tendency to sag. Conversely, if the support areas are too large and exhaust areas too small, doming of the glass tends to occur. Also, the pressure differential between the supporting pressure and the exhaust pressure must not be too great in order to avoid sagging.

Finally, it is important that the support be provided by a diffused and relatively small gas flow to provide substantially uniform pressure across the width of the support zone, thereby avoiding deformation, such as dimpling, from velocity pressure due to the direct impingement of localized jets of gas against the supported glass surface. The module embodiments illustrated in FIGS. 21 to 30, 32 and 33, when assembled to form a supporting bed and suitably supplied with gas from a plenum chamber in a manner to be described in more detail, provide the uniform support required to process glass at elevated temperatures substantially free from distortion in the manner herein disclosed.

As indicated by the embodiment depicted in FIGS. 21 and 22 and shown schematically in FIG. 19, each module 31 forms an open-topped chamber, being essentially closed on its other sides, the upper terminus of which defines a zone of substantially uniform pressure (a profile of which is diagrammatically shown in FIG. 19) beneath the overlying glass. The pressure is exerted by gas supplied to each module from the supporting plenum chamber by way of the hollow supporting stem 32. A nozzle 150, in threaded engagement with an opening 162 in the base of the module 31 and having a bore 163 connected with the bore 164 of module stem 32, provides a gas inlet to the module chamber and also functions to diffuse the gas by changing the direction of flow to a horizontal direction as the gas escapes and expands into the module chamber through a plurality of bores or orifices 151 in the nozzle. The orifices 151 are so disposed to prevent direct impingement of pressurized gaseous fluid against the supported glass surface so as to prevent dimpling of the glass from the velocity pressure of a localized jet of gas. They deliver the gas to the module in a path which is initially out of the path of the glass. As shown in FIG. 22, the initial path is toward the module side wall below the upper edge thereof. However, the initial path may be downward, or as a horizontal spiral, or may be baffled or otherwise obstructed as long as it does not initially impinge against the glass. By feeding the support gas into the large module chamber through a conduit or orifice which is smaller in cross section than the module, the gas diffuses into the gas of the chamber, producing a diffused flow, thus ensuring uniform pressure across the upper edges of the module.

Pressure profiles across the upper terminus of a module may be determined in the following manner: A pressure sensing plate having a small hole therethrough is positioned above a module and spaced from the upper terminus thereof a distance corresponding to the height of a supported sheet, e.g., 0.010 inch. A pressure transducer is connected to the sensing hole and the electrical output of the pressure transducer is connected to a recorder which will graph pressure variations on one axis and displacement of the pressure sensing plate on the other axis. The pressure transducer controls the displacement of the recording device along, e.g., the Y axis of the graph. A potentiometer, the shaft of which is rotated by relative horizontal movement between the sensing plate and the module translates such movement to an electrical signal which controls the dislacement of the recording device along the other, or X axis, of the graph.

Most advantageously, the relatively small size of orifices 151 of nozzle 150 provides a drop in gas pressure from the interior of the plenum to the interior of the module, and in so doing, performs three important functions: first, it prevents modules not covered by the supported glass from allowing the rapid escape of gas from the common plenum, which would reduce the pressure in the plenum and, hence, in the covered modules; second, it prevents variations of load above a module from affecting the flow of gas from the plenum into the module; and, third, it diminishes the effect of any slight variations in plenum pressure upon the pressure within the module. With this arrangement, the gap between the upper terminus of the module and the lower surface of the supported glass becomes self-adjusting to a uniform size about the entire upper periphery of the module, which size is a function of the weight of the glass supported. This occurs because the flow of gas from the plenum through the module and to the exhaust area passes through two restrictions: the orifices 151 in the base of each module, and the gap between the upper terminus of the module and the supported glass. Because the gap is normally quite large with respect to the orifices 151, there will be a substantially constant pressure drop through the orifices from the plenum to the module. The pressure per unit area of cross section across the module is, under normal equilibrium conditions, equal to the weight per unit area of supported surface of the glass which it supports, the gap between the module and the glass adjusting in size (i.e., changing the height of support of the glass from the module) until this pressure is obtained. Thus, if the gap becomes very small due to a heavy piece of glass or an external force upon the glass, the pressure within the module will increase until the pressure balances the load or until plenum pressure is reached as the gap approaches zero. If the gap diminishes to zero, there is, of course, insufficient pressure to support the load. The glass will be raised from the module by the gas in the module impinging against the lower surface of the glass under any module pressure greater than the weight of the glass, thus increasing the size of the gap and reducing the module pressure. In this manner, the gap is self adjusting to a uniform size, dependent upon the weight of the glass, the plenum pressure and the size of the orifices. The rate at which the pressure within the module builds up with decrease in the gap is a function of the rate of gas flow into the module and the volume of gas in the module. Hence, the orifice must not be so small for a given plenum pressure as to restrict the flow of gas into each module to the extent that excessive time is required to increase the pressure in response to a decrease in support spacing. In most cases sufficient gas should enter the chamber within not more than one second, generally less than 0.1 second and preferably almost instantaneously to supply the required increased pressure necessary to prevent the glass from touching the uppermost module edge.

Modules of small volume are more responsive for this purpose than are larger modules for a given flow rate. Generally the modules herein contemplated have a volume below 25 cubic inches, preferably not over about 10 cubic inches and most desirably less than about 2 cubic inches. By forming the support bed from identically constructed modules and supplying them with uniform pressure, each module will support the overlying portions of the glass sheet or plate along a desired surface. The proximity of adjacent modules results in substantially uniform support under the entire area of the glass sheet to assure a product substantially free of distortion.

As shown in FIG. 19, the gas within each module escapes across the upper terminus of the module walls to zones of lower pressure between adjacent modules. This lateral flow of gas between the module wall and the glass results in a progressive pressure drop across the width of the wall. However, the resulting area of nonuniform support pressure directly above the wall thickness and the area of reduced pressure at the exhaust zones between the modules is minimized by utilizing thin module walls (rarely averaging greater than ⅜ inch) and relatively low gas flow which permits the exhaust areas between the modules to be kept small yet adequate to exhaust the gas without building up back pressure. This is shown by the module pressure profile of FIG. 19 wherein the dips shown in the pressure profile at the exhaust areas are sufficiently small to have no adverse effect on the moving supported material. Thus, a substantially uniform average support pressure is achieved, as shown in dotted line in FIG. 19.

Each module 31 of the embodiment shown in FIG. 19 is square and exhausts radially in all directions to the surrounding zones of lower pressure, resulting in the pressure profile shown. The pressure over the exhaust areas, while lower than the support pressure, generally is slightly above ambient pressure to provide a gas flow from the supported surface to the exhaust channel beneath the modules.

The modules of the embodiments disclosed herein may vary in size, depending upon such considerations as the size of the glass sheets to be supported and the uniformity of support height desired along the dimensions of the supported glass. While square modules having outer dimensions of approximately one inch have been found to be generally satisfactory for a large range of glass sheet sizes, the module size may well vary in dimensions from about ⅛ to 2 or 3 inches on each side and need not be square, there being numerous other geometric or irregular shapes equally suitable. To achieve satisfactorily uniform support characteristics for sheets of glass or other sheet material heated to a deformation temperature, the distance across the upper terminus of each module forming the support bed should be no more than ½ of the correspondingly oriented dimension of the supported sheet and preferably should be less than ⅕ thereof. The module depth from the bottom to the open top may vary but must be substantial. Normally, it will be at least ¼ inch deep and in most cases ½ to 1 inch or more.

Figure 31:
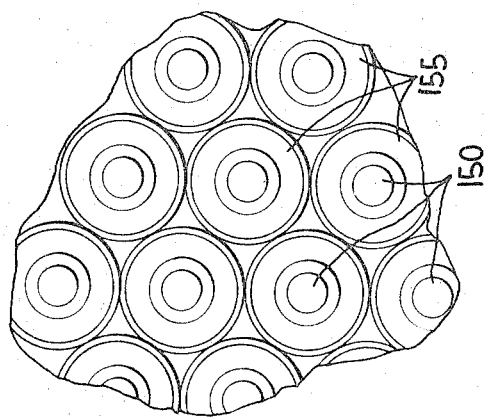
FIG. 31 is a partial plan view of a module bed of the module units shown in FIGS. 29 and 30.
Figure 29:
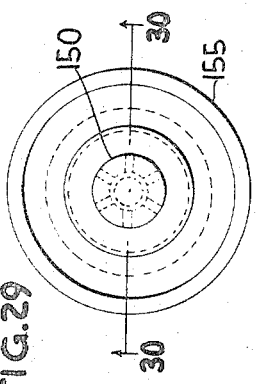
FIG. 29 is a plan view approximately double scale illustrating a support module unit having a circular cross section in the plane of support.
Figure 30:
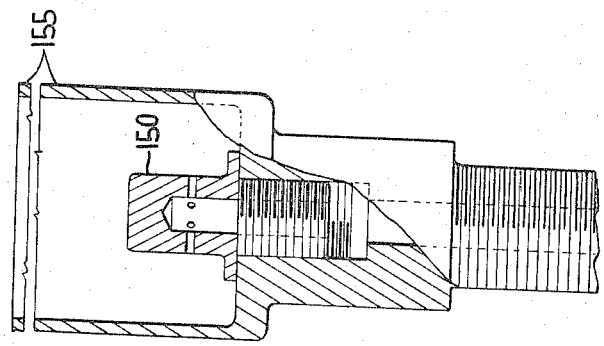
FIG. 30 is a section taken along line 30—30 of FIG. 29.

FIGS. 23 and 24, FIGS. 29 and 30, and FIGS. 32 and 33 illustrate additional embodiments of modules suitable for use in the heating section. The module 152 of FIGS. 23 and 24 is subdivided into four cavities, 152A, 152B, 152C and 152D, each of which is supplied with gas from an orifice 153 connected to the plenum chamber through hollow stem 154. Each cavity functions, in effect, as a submodule and the pressure profile across the entire internal width of module 152 is substantially flat with the advantage that support is provided as the traveling workpiece covers any one submodule and before the entire unit is covered. The module 155 of FIGS. 29 and 30 is similar to module 31 but is cylindrical in shape to provide, when juxtaposed with others upon a plenum, triangularly shaped exhaust areas between mutual points of contact, as shown in FIG. 31.

Figure 32:
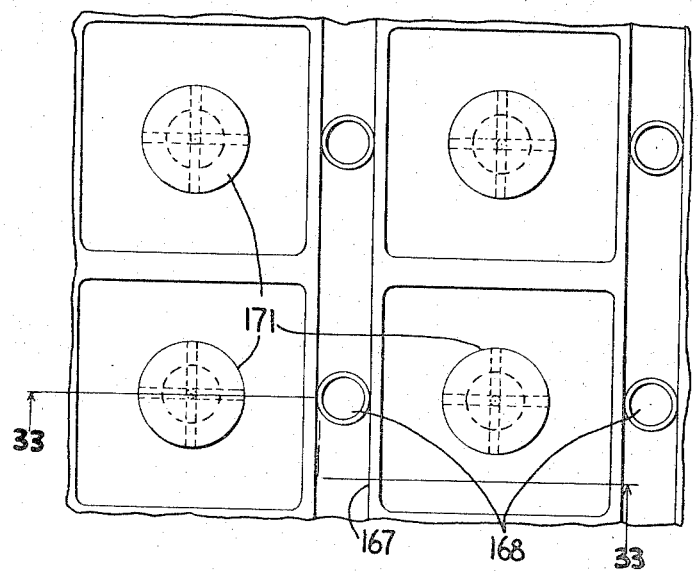
FIG. 32 is a partial plan view of support modules arranged in rows with alternate longitudinal exhaust grooves.
Figure 33:
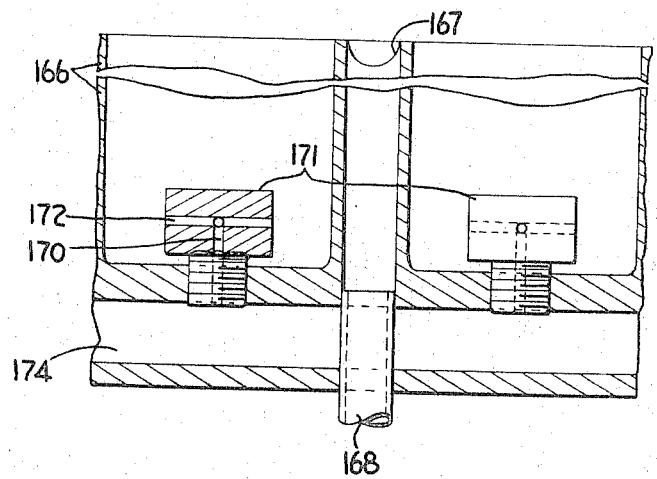
FIG. 33 is a section taken along line 33—33 of FIG. 31.

Module 166 of FIGS. 32 and 33 is similar to module 31 except that a plurality of these modules form an integral row and successive rows are spaced, one from the other, to provide exhaust zones 167 with ducts 168 to provide communication between the exhaust zones and the surrounding atmosphere. Alternatively, the rows may be individually formed with independent plenums and spaced from each other to form exhaust zones. A bore 170 in nozzle or baffle member 171 connects four orifices 172 in the nozzle with the plenum chamber 174 to provide for the passage of gas from the plenum to the module cavity.

FIG. 20 illustrates one embodiment of a module 81 constructed to provide enhanced heat transfer characteristics for the quenching zone. This module is similar in construction and operation to the module 31 insofar as the principles of air-film support are concerned. The mass of the module wall 158 and of the nozzle 159 has been increased to locate a substantial mass of metal adjacent the supported glass while maintaining acceptable support characteristics, such as pressure uniformity.

In operation, a portion of the module stem 82 is surrounded by a heat exchange medium such as water or other fluid separately circulated through a cooling box 83 to cool the quenching modules 81 and to prevent heat distortion or to hold them at a substantially uniform temperature (e.g., plus or minus 100 degrees Fahrenheit) from module to module. Cooling gas flowing under pressure from plenum chamber 84 into the module cavities provides support for the glass in the quench zone in the same manner as the gas of the heating section provided support. The gas escapes through exhaust channel 78 between the modules and the cooling box to the edge of each quench bed. The majority of the cooling of the supported glass is accomplished by convection through the flow of gas from the module to the exhaust area; a moderate amount of cooling takes place through heat conduction from the glass, through the gaseous support medium, to the module; while very little cooling is accomplished through heat radiation from the glass to the module. FIGS. 9 and 10 illustrate similar quenching modules, each with slightly different nozzles 165 and 175, respectively designed to position a large metallic mass as close to the glass surface as possible.

As previously explained and as shown in FIG. 9 and schematically in FIG. 20, a quench module which in essence constitutes a mirror image of the lower module is positioned above the supported glass to quench the upper surface of the glass. As shown therein, flow rates adjusted to provide equal heat transfer from each side of the glass may result in a larger gap between the glass and the upper modules than between the glass and the lower modules because the weight of the glass is supported by the lower modules. While it has been found that high flow rates generally disturb somewhat the desired static pressure characteristics of the support zones, they may be tolerated in the quench section because the presence of opposing pressure zones on each side of the supported glass counteract and hence minimize any disturbances to the glass and in actual practice maintain an equilibrium and uniform support plane.

FIGS. 25 and 26 illustrate another embodiment of a quenching module 81, similar to that of FIG. 20 in all respects except that the nozzle 160 terminates in the form of a cone to maintain a large metallic mass near the glass surface while improving the uniformity of the pressure across the module cavity and increasing the size of the cavity.

Figure 27:
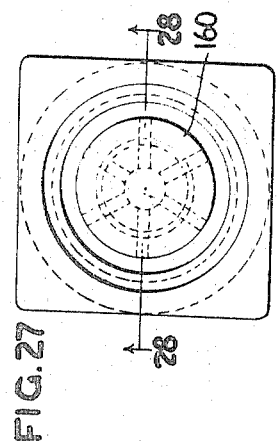
FIG. 27 is a plan view of a quenching module unit having a step in the marginal walls to enhance turbulence of the quenching gases at the gas-glass interface.
Figure 28:
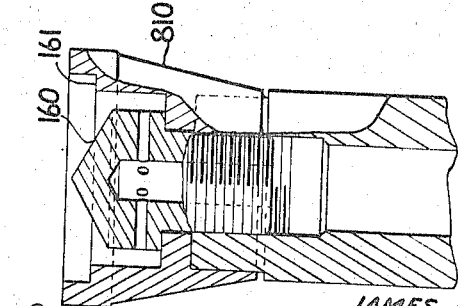
FIG. 28 is a section taken along lines 28—28 of FIG. 27.

FIGS. 27 and 28 illustrate another embodiment 810 of a quenching module which produces enhanced heat transfer characteristics by a step 161 in the periphery of the module wall. In this manner good support characteristics are maintained and high gas turbulence is produced due to the entrance effect as the gas flows across step 161 and then enters the gap between the upper terminus of the module and the supported glass. This results in more uniform and greater average cooling across the module bed. At the same time, the mass of the module is maintained relatively large to conduct heat from the modules to the water in cooling box 83 so as to maintain a uniform temperature throughout the module bed. It has been found that a turbulent flow of gas, even at relatively low velocities, becomes a dominant factor in the cooling of the glass. In fact, with the module 810 of this embodiment, convective cooling accounts for approximately eighty percent of heat transfer from the glass and results in a substantial increase in the total cooling rate.

It should be understood, of course, that the quenching modules could advantageously be used in the heating sections of the lehr and would, due to their enhanced ability to transfer heat, aid in raising the temperature of the glass. However, the advantages of rapid heating are not comparable to the necessity of rapidly cooling the glass to produce a temper, and this, coupled with the more intricate design of the quench module and the limited materials from which to fabricate a module that must function at temperatures approaching the 1200 degrees Fahrenheit in the heating section, militate against their commercial use.

OPERATION

The following are examples, by way of illustration only, of preferred modes of operation of the invention disclosed herein as applied to the treatment of glass sheets.

A. *Tempering*

Sheets of glass one-quarter inch nominal thickness and approximately 16 inches wide by 27 inches long are placed lengthwise seriatim upon the apron roll unit 5, properly aligned by guide collars 21 and conveyed on rolls into and through preheat units 6 at a line speed of 1.3 inches per second. In this manner an average of about 90 pieces of glass per hour are conveyed through the system. Electric heating coils 18 above and below the moving glass supply heat to the preheat section with an average power input of approximately 32 kilowatts to raise the temperature of the glass to approximately 950 degrees Fahrenheit surface temperature in approximately 15 feet of glass travel.

As the leading edge of the glass sheet leaves the last roll of the preheat section and progressively covers modules 31 forming support bed 30, the sheet becomes partly and finally fully supported by the uniform pressure of the gas emitted from the modules. The magnitude of this gas pressure is never large and, in any event, is held low enough and uniform enough from module to module so that it does not cause bowing or other deformation of the glass. Because the modules offer little or no support when only partially covered with glass, the rows are oriented at an angle from normal to the path of travel so that the edges of the glass sheet are at all times supported at least at spaced positions. In addition, this orientation assures even heating of the glass by preventing some portions thereof from traveling the length of the heating section over only exhaust areas, as would be the case if the modules were aligned in the direction of glass movement. Once the glass becomes gas supported, it is conveyed by edge contact through frictional engagement of its lower edge with rotating drive members 37. For this purpose, the entire system is positioned in a common plane tilted at an angle of five degrees with respect to the horizon to provide the glass with a component of force normal to the driving disks.

Gas burners 34 are supplied natural gas and air in proportions by volume of approximately one to thirty-six, respectively, which includes 260 percent excess air over that required to provide complete combustion. The natural gas is provided at a rate of approximately 60 cubic feet per hour per square foot of bed. The products of combustion are introduced to the plenum chambers, producing therein a pressure of approximately 0.5 pound per square inch gauge. Each module includes orifices which reduce this pressure in the module cavities when they are covered with glass to about ½₁ of the plenum pressure. Gas is introduced to the stem of each module at a temperature of 1200 degrees Fahrenheit and a volume flow of approximately 1.3 cubic feet per minute.

The module bed of this example is constructed of 120 modules per square foot of the type shown in FIGS. 21 and 22, and the upper terminus of each module forms a square, the outer sides of which are one inch long, the spacings between the walls of adjacent modules being $\frac{3}{32}$ of an inch. Each wall is $\frac{1}{16}$ inch thick. For each square foot of glass area, the bed construction used herein provides 0.64 square foot of gas supply area (i.e., internal area of module at its upper edge), 0.163 square foot of gas exhaust area, and 0.196 square foot of module wall area separating the supply areas from exhaust areas. The nominal module support pressure when covered by the quarter-inch-thick glass is 0.023 pound per square inch above that existing above the glass which provides nominal spacing of 0.010 inch between the underside of the gas film supported glass and the upper terminus of the module wall. The nominal exhaust pressure is substantially one atmosphere absolute.

To heat the glass, the supporting gas is held at a temperature above (usually at least 10 to 50 degrees Fahrenheit above) that of the glass during the heating stage or until the glass has reached the desired temperature. In this case, heat is added to the glass plates convectively and radiantly from the supporting gas which is at a temperature of approximately 1200 degrees Fahrenheit and is added radiantly into the chamber from ceiling heating coils 18 at a temperature above (at least 25 degrees Fahrenheit above) that of the glass, usually about 1300 degrees Fahrenheit. When no glass is fed into the furnace, an average power input rate of approximately 30 kilowatts is established. As glass is fed into the furnace, the heaters are actuated to supply the fluctuations in heat demand. In this manner the temperature of the glass is raised to approximately 1200 degrees Fahrenheit or slightly below by the time it completes its travel through the 15 foot length of the heating section. Floor coils 18 beneath the plenum chambers consume power at an average rate of approximately 58 kilowatts under no-load conditions and supply heat at about 1300 degrees Fahrenheit to help maintain the ambient heat level in the furnace chamber and keep the plenum boxes hot. These coils may also supply heat to the module walls through conduction from the plenum box. Because heat must be applied equally to the top and bottom of the glass sheets to prevent bowing or other warpage of the glass, the gas is supplied at the approximate temperature to which the glass is to be finally heated. The radiant heat energy level (e.g., temperature) above the glass is then adjusted to balance the heat from below to keep the glass sheets flat. For example, glass bowed convexly upward in the early heating zones or in the quench zone frequently indicates excessive radiant heat. To achieve this desirable balance, it is advantageous to maintain the temperature of the radiant heat source disposed above the glass higher than that of the gas. Preferably, the temperature of the radiant source is 25 degrees Fahrenheit or more above the temperature of the supporting gas. The speed at which the glass is conveyed through the heating section is then controlled to obtain the proper heat input per glass unit and hence the proper temperature for tempering in the subsequent quenching section.

As the leading edge of the glass passes over the sensing element 143 of pressure switch 144, a timer on a control mechanism begins to run. The timer is adjusted for the particular speed at which the glass is being conveyed to actuate the high speed run-out when the leading edge of the glass reaches the end of the heating section. At this time the drive for the last three disks 37 of the heating section and all disks 370 of the quenching section changes from motor 147 to motor 146 through the deactivation of clutch 58 and the activation of the clutch connecting motor 146 to its drive 145. Because of the high speed operation of motor 146, the glass sheet is rapidly conveyed from the heating section to the quenching section at a rate of approximately 10 inches per second. The timing device then returns the clutches to the original condition to disconnect motor 146 and to connect shaft 470 with shaft 47 to convey the glass sheet through the quench section at normal speed.

In the quenching section, air at an ambient temperature of approximately 100 degrees Fahrenheit is supplied to upper and lower plenum chambers to provide plenum pressures of 1.37 and 0.75 pounds per square inch, respectively. Each module includes orifices which reduce this pressure to about 1/8 of the plenum pressure as the air escapes into the module cavities. The air is emitted at rates of 2.0 and 1.5 cubic feet per minute per module above and below the glass, respectively. Water is circulated through cooling boxes 83 at a flow rate of 1 gallon per minute per square foot of bed, the inlet temperature of the water being about 60 degrees Fahrenheit and outlet temperature being about 80 degrees Fahrenheit. Each quench module bed of this example is formed of one-inch square modules of the embodiment shown in FIGS. 25 and 26 evenly spaced from each other to provide 102 modules per square foot. For each square foot of glass area, there is provided 0.24 square foot of cold air supply area, 0.29 square foot of exhaust area and 0.47 square foot of module wall area. The gap between walls of the adjacent modules is 3/16 of an inch. The average spacings of the glass from the lower and upper module surfaces measured to the opposed glass surface is 0.010 inch and 0.050 inch, respectively. The overall heat transfer coefficients above and below the glass are equal and about 81 British thermal units per square foot per hour per degree Fahrenheit. Of the heat removed, convection accounts for approximately 80 percent, conduction and radiation accounting for the remainder.

The module rows of the quenching section are oriented at a slight angle, usually 3 to 45 degrees and in this case 10 degrees, from normal to the path of travel to support the edges of the glass in the manner explained with respect to the heating section, and to assure even cooling of the glass over the entire surface thereof to minimize the formation of an iridescent stress pattern in the glass.

The glass travels through the 7 feet of the quench zone in approximately 30 seconds. In the initial 15 seconds, the temperature of the glass is lowered through the annealing range. In the remaining 15 seconds, the temperature of the glass is lowered to approximately 600 degrees Fahrenheit. The glass, at this point being no longer deformable, is conveyed from the air support of the quenching system to the rolls of the delivery system by disks 370 and thence to their next destination.

Quarter-inch thick glass so tempered has a stress, in terms of the center tension thereof as indicated by the birefringent effect of the glass on polarized light waves, of approximately 3200 millimicrons per inch of glass length as measured by standard techniques using a polariscope. Stress will hereinafter be referred to in terms of the center tension expressed in "millimicrons per inch."

B. *Annealing*

Glass sheets one-quarter inch thick and approximately 16 inches wide by 27 inches long and having a stress of 260 millimicrons per inch, which are to be reannealed to lower the residual stress, are placed lengthwise seriatim upon the apron roll unit 5, properly aligned, and heated to 950 degrees Fahrenheit in the preheat section in the same manner as explained in the tempering example. Likewise, the glass sheets are transferred to and transported through the heating section in the same manner as in the tempering example and under the same operating conditions with the exception of the temperature level and speed of travel. In the annealing process the glass is rapidly heated to a temperature of approximately 1025 degrees Fahrenheit, which is at or near the upper limit of the annealing range. For this purpose gas is introduced into the plenum chambers and emitted from the modules at a temperature of approximately 1200 degrees Fahrenheit just as in the tempering process. This heat is, of course, balanced by electrical heaters above the glass to prevent bowing. When the glass reaches 1025 degrees Fahrenheit, this temperature is maintained for approximately 60 seconds during which time the internal stresses undergo relaxation. The products of combustion introduced to the succeeding plenums and associated modules over which the glass passes from this point are reduced in temperature by a reduction in the quantity of natural gas supplied to the burners. The supply of air is increased to maintain constant plenum pressures throughout the heating section. The temperature of the gas used for support is thereby progressively decreased stepwise from plenum to plenum, as is the heat supplied by the electric heating coils above the glass, until the temperature of the glass reaches 600 degrees Fahrenheit which is below the lower limit of the annealing range. Below the lower limit of the annealing range, only temporary stress results and the cooling curve followed to room temperature is not critical. In addition, the glass has already been cooled to below its deformation temperature, and the glass is therefore conveyed directly from the last gas support heating unit to the delivery section. The stress in the glass can be lowered by this process to approximately 45 millimicrons per inch with no visible distortion or marking from the conveying apparatus.

It should be recognized that once the temperature of the glass reaches the holding temperature of the annealing process, the hot gas of the support and the upper heating elements no longer produce a net heat flow to the glass but rather selectively retard the cooling of the glass along the predetermined annealing curve. It should be understood that other annealing curves or variations in the annealing curve described may be used, depending upon the final stress desired and the time for annealing or the length of the heating section that is available.

C. *Bending*

Sheets of glass one-quarter inch thick and approximately 16 inches wide by 27 inches long to be bent to a cylindrical curve having a 60-inch radius and thereafter tempered are placed lengthwise seriatim upon the apron roll unit 5, properly aligned, and heated to 950 degrees Fahrenheit in the preheat section in the same manner as explained in the tempering example. Likewise, the glass sheets are transferred to and transported through the heating section in the same manner as in the tempering example with the following differences. The design of the module bed is changed, as illustrated in FIG. 15, to present a gradually changing plane of support from one which is initially flat to one which is convex and cylindrically curved about an axis parallel to the direction of glass travel. This change begins approximately 125 inches from the beginning of the heating section where the glass has attained a temperature level of about 1200 degrees Fahrenheit and is sufficiently soft to readily follow the gradually changing contour of the module bed at the speed at which the glass is conveyed. The temperature of the supporting gas is held at about 1250 degrees Fahrenheit and that of the radiant source at about 1350 degrees Fahrenheit.

If the curved glass sheets are to be tempered, they are transferred to a quench section (not shown) and tempered in the same manner as explained in the tempering example. The upper and lower quenching beds are of complementary shape necessary to accommodate the 60-inch radius of the curved glass sheet. In this manner, the curved shape is maintained during the quench and thus throughout the period during which the glass could be readily deformed. The cooled glass is then transferred from the quench to the delivery section rolls.

If the curved glass sheets are to be annealed rather than tempered, additional heating units must be provided which have module beds conforming to the configuration of the desired curvature. Once the glass has assumed the desired shape, it is supported upon and conveyed across these additional and subsequent module beds while the temperature is first lowered to about 1025 degrees Fahrenheit, then held at that temperature for a short period of time to substantially eliminate the thermal gradient through the glass thickness, and finally cooled at a progressively increasing rate to the lower limit of the annealing range, just as described in the annealing example included herein. At this point, the glass may be transferred to the delivery section for cooling to room temperature and removal.

D. Coating

The present invention is especially valuable when applied to the provision of deformable or visco-elastic materials with coatings which must be cured, produced or developed at a temperature at which the base is subject to deformation or warping. Often the durability of an enamel coating on glass can be improved by heating the enamel at a deformation temperature for the glass base. However, since such a high temperature would warp the glass, this improvement in durability cannot be achieved in usual processes. By supporting and heating the glass coated with enamel frit on the gas support herein disclosed, the frit can be fused at higher temperatures without the deformation previously encountered.

In a typical embodiment, glass sheets are sprayed with the following composition:

| | | |
|---|---|---|
| Bentonite | grams | 1.2 |
| Cryolite | do | 0.8 |
| Boric acid | do | 0.3 |
| Methanol | cubic centimeters | 10 |
| n-Propanol | do | 15 |
| Water | do | 75 |
| Sodium pyrophosphate | grams | 0.1 |
| Aluminum powder (Alcoa No. 322) | do | 10 |

The glass thus coated is fed through the preheating and heating zones herein disclosed, the temperature of the supporting gas passing through the modules being 1250 degrees Fahrenheit and the temperature of the radiant heat source being 1350 degrees Fahrenheit. The glass sheet is held at this temperature until the metal coating has bonded itself to the base. Thereafter it is withdrawn from the heating section and cooled.

Other transparent, or light reflecting, or opaque films of known composition may be applied and cured in the same way. Furthermore, glass sheets may be heated in the heating section as hereinbefore described to a temperature of about 1100–1250 degrees Fahrenheit and sprayed with stannic chloride or an aqueous solution thereof while the glass is fluid supported above the modules referred to, thus producing a transparent electroconductive tin oxide coating on the glass.

VARIATIONS AND EQUIVALENTS REVIEWED

While the operating examples disclosed above illustrate embodiments of this invention, in many instances it is possible to alter these values or constituents or substitute equivalents therefor to obtain substantially the same results in substantially the same way to produce the same results.

Within the contemplated module and support bed design, variations in module size, construction and spacing may be made which result in a change of actual and relative support areas, module wall areas, and exhaust areas as well as in the actual and relative gas pressures utilized for support. Of course, the ultimate test of acceptable variations is the success of the arrangement in supporting glass in a uniform manner and without deformation at temperatures above the deformation temperature of the glass. Nevertheless, the following factors merit consideration in determining acceptable variations.

Deformation of the glass does not take place when the glass is heated on the system herein disclosed because adequate design of the support has been provided. Thus, support areas and exhaust areas are so interspersed that gas can be rapidly exhausted at negligible pressure drop from under the glass between the module spaces and thence through the exhaust channel 77 and ducts 39 to the sides of the glass or bottom of the furnace—ultimately to the exterior atmosphere.

The pressure drop between the exhaust and that within the module while supported by the glass generally is small, often of the order of a few ounces per square inch. The pressure is sufficient, however, to maintain the glass an adequate average distance from the upper edges of the module which should be at least 0.001 inch, preferably above 0.003 inch, above the module edge. Otherwise there is danger that the edges of the modules may occasionally contact and mar the hot glass. On the other hand, this pressure differential should not be so great as to create an average gap between the lower surface of the glass and the edges of the modules greater than 90 percent (preferably less than 50 percent when glass ⅛ inch in thickness or more is heated) of the thickness of the glass supported. This gap, as normally established, ranges from 0.003 to 0.015 inch, and in most cases (particularly in the case of glass ⅛ inch and larger in thickness) the clearance or gap does not generally exceed an average of 0.050 inch, preferably being not over 0.025 inch. Unusually good heat transfer takes place when the gap is at this spacing, the heat transfer coefficients being many times those observed with wider spacings. This is caused by a change in direction and an increase in the net average velocity of the gas flow at the peripheries of the modules relative to the previous velocity of the gas flow interiorly of the module. Such a change in direction and velocity tends to strip away the thin boundary layer of insulating air on the surface of the glass sheet, which would otherwise remain, and hence the rate of heat transfer is greatly increased.

It will be understood that the size of this gap is a function of the pressure of gas in the module and the flow rate therefrom. By holding the gap between the modules and lower surface of the glass disposed on the gas of the modules within the range specified above, the glass becomes automatically disposed at a substantially constant level above the bed without contact with the modules and without substantial flutter. Thus, as the glass approaches the module, it tends to restrict the flow of gas from the module and the pressure in the module rises above its normal support pressure toward a value of the pressure in the plenum. This tends to push the glass away from the module bed.

Conversely, if the distance between the module and the glass increases, the pressure exerted on the glass by the gas in the module falls toward the level of the exhaust pressure, thus causing the glass to fall back. Thus, the glass becomes automatically stabilized at a substantially constant level over the bed and deformation of the glass is minimized because of the intrinsic nature of the glass to seek its automatic level. This phenomenon occurs so long as the clearance between the glass and the module is held within the range specified above.

The percent of the area above the modules (including the area of the module walls and the area enclosed by the walls) within a central or support portion of the bed, based upon the area of such portion, exceeds 50 percent. However, the area above the exhaust zones of such portion (the exposed area which is outside the outer edge of the module walls) is above 5 percent based upon the area of such portion. Adequate exhaust as well as adequate support is provided.

Supply of the gas to the module is effected under conditions (e.g., by feeding the gas through orifices as heretofore described) such that the ratio of pressure drop between the plenum chamber or gas reservoir and the modules supporting the glass to the pressure drop between such covered or glass supporting module and the exhaust spaces is held high being above 2, preferably above 3 and in most cases above 5. In the specific embodiment described above, the ratio is about 21.

By maintenance of this ratio, several advantages accrue. Any pressure exerted by the glass tending to restrict flow of gas from the module automatically causes the module pressure to rise above its normally established low pressure toward the higher plenum pressure, thus forcing the glass away from the module and restoring normal flow. On the other hand, maintenance of the substantial pressure drop between the plenum and the module permits the module pressure to be low and eliminates any tendency for establishment of high speed jets of air from modules which are unloaded. That is, by imposing substantial restrictions (or pressure drop) in the gas conduits between the modules and the plenum chamber, there is little difference in the flow of gas through unloaded and loaded modules. Hence, as the glass passes over the modules it is promptly and effectively provided with support, but the supporting force is so uniformly available over all of the modules that there is no appreciable tendency for the gas escaping from an unloaded module to raise an edge of the glass and thus cause the glass to teeter or flutter as the edge begins to move across an unloaded module. Furthermore, by supplying gas from a plenum under higher pressure to the low pressure support zones, fluctuations in pressure over the bed and/or during operation are minimized.

Considering the entire support system, it is apparent that it provides a plurality of support zones which are spaced from other such zones in all directions across the bed. The individual modules which provide a supply of supporting gas are separated in all directions from other such support areas by solid partitions, i.e., the walls of the module, which restrict lateral flow of the support gas. On at least a portion of their sides, they are separated by exhaust spaces. Thus, in the case of the illustrated one-inch square modules heretofore described, the modules are surrounded by exhaust spaces. This provides a very uniform support system.

As shown in FIGS. 32 and 33, the modules may be in a series of rows in which adjacent modules in the rows abut, either having abutting walls or having a common partition or wall. In this case, the exhaust areas are disposed only on two sides of the support areas.

It will be recognized that the particular orientation of the module rows relative to the path of glass travel in the preferred embodiment may not only be varied with respect to the angle at which the rows are disposed, but may also be varied in other manners to achieve the desired uniform treatment of the glass. Thus, rows of modules, such as those formed from modules surrounded by exhaust spaces or from those having a common wall, such as shown in FIGS. 32 and 33, may be arranged normal to the path of glass travel but with the individual modules progressively offset from one row to the next. With this arrangement, as with that described in the preferred embodiment, any given portion of the sheet of glass passes across noncorresponding portions of the pressure and exhaust zones in adjacent rows. Thus, a straight line taken in the direction of travel of the glass will cross successive module chambers in adjacent rows at different distances from a corresponding portion of the periphery of each chamber. In this manner, any one portion of the glass sheet can be subjected to a progressively changing relationship with respect to an underlying module. The degree of offset of the module walls, from one row to the next in the direction of glass travel, should be such that the pattern of modules is nonrepetitive in that direction for a distance of at least two rows and preferably for a distance of at least five rows.

The size of the individual support areas is small with respect to the bed and also with respect to the glass to be supported. Thus, the maximum dimensions of a support area from one side to an opposed side, both in the direction of the path of the glass and normal thereto, rarely exceeds an average of three to four inches, and usually is below an average of 2 inches, even when large sheets are supported. On the other hand, the minimum of such dimensions measured in the same directions is rarely below ⅛ inch. Further, these maximum dimensions are not over one-half the width of the width of the glass measured in the same direction, and preferably are less than 20 percent, usually being below 10 percent, of such width. As previously mentioned, the volume of these zones generally is low in order to make the zone more responsive to variations in the gap between the glass and the upper terminus of the module walls. The modules have substantial depth, normally at least ¼ inch, and in most cases ½ to 1 inch or more. The gas is introduced into the lower part of the module to ensure diffusion.

The spacing between the modules or support areas is small with respect to the size of the support areas, the average spacing in the path of the sheet and also normal thereto generally being less than one-half, preferably less than one-fourth, the average width of the support areas (measured from outside wall to outside wall of the area or module) when glass having a thickness up to ½ inch is treated. With thicker glass this spacing may be somewhat greater.

Further, the respective support areas are disposed so that average exhaust spaces between such support areas, measured in the direction of the path of glass and normal thereto, are less than one inch, usually being about ⅓₂ to ½ inch.

The supporting gas supplied to the modules in the heating section is provided by burning a carbonaceous fuel, such as methane, in an excess of air, enough excess air being used to supply the amount of supporting gas required. Thus, the supporting gas constitutes a mixture of carbon dioxide, nitrogen, and water vapor. The temperature of the products of combustion will be below 2000 degrees Fahrenheit, usually below 1500 degrees Fahrenheit, and preferably between 1200 and 1300 degrees Fahrenheit.

Other gases may be used. Thus, air may be preheated and fed to the modules. Alternately, steam and air may be mixed and so used or the supporting gas may consist substantially wholly of hot air, superheated steam or carbon dioxide.

The particular nozzles disclosed herein have a plurality (4 to 6) of bores which discharge into their respective modules or compartments. It is to be understood that the number, size and direction of the bores or orifices may vary, as long as the desired pressure drop is obtained and the gas is emitted in a direction which prevents direct impingement thereof on the glass surface being supported from the point of entry of the gas into the module. Thus, the gas is fed into the module toward the bottom or sides or in other directions so that the stream is baffled, diverted, deflected or diffused before it impinges against the glass. Vertically or horizontally disposed baffles or gravel, sand, balls or like packing may be placed in the module to obstruct the flow of gas and produce substantially uniform pressure of the gas against the module across its width and to avoid establishing localized jets which are smaller in cross section than the module interior.

Various module shapes may be provided which are suitable for the purposes disclosed herein without departing from the teachings. Thus, while square and circular shapes have been disclosed, modules of hexagonal, octagonal, elliptical or even spiral shape, to mention only the most obvious variations, would function in the same manner.

In the tempering of glass according to the present invention, adequate heat transfer to establish a symmetrical cooling gradient from the center to the surfaces of the glass sheet, to produce the desired degree of stress in the glass, is important to the design. In this connection, two factors permit a degree of flexibility in the module bed construction of the quench or tempering system that is not enjoyed in the heating bed: a rapid cooling of the glass to temperatures below the deformation temperature, and an opposing pressure above the glass.

The module bed positioned above the glass being supported and quenched is described in the operational example disclosed herein as a duplicate of the lower bed to facilitate the establishment of an equal rate of heat transfer from each surface of the glass, and to minimize support problems and deformation that would occur from uneven pressure or localized jets of air on the top surface of the glass. However, the upper quenching bed need not be a mirror image of the lower support bed of the quenching unit to accomplish the results desired. For example, other cooling means, such as nozzles or slots adjacent the upper surface of the supported glass, could be used in conjunction with the lower module bed.

The tempering or quenching operation in accordance with this invention should be conducted under conditions such that the rate of heat removal is substantially the same on each side of the sheet. Otherwise, warped or distorted glass is produced. This may be conducted effectively by adjusting the flows by regulating the pressures in the respective plenums. In such a case, the relative pressures in the upper and lower plenum chambers are adjusted so that the glass is disposed between the upper and lower beds of modules in such a way that the gap between the upper modules and the upper glass surface is usually greater than the gap between the lower surface of the glass and the lower modules.

Other means may be provided to ensure this desired balance of heat removal from both sides recognizing that the rates of flow of gas on opposite sides must in any event be so conducted that the upward supporting force exercised by the gas of the lower modules is not completely canceled by the downward force of gas flowing from the upper modules. For example, balanced heat removal at unequal gas flow rates can be accomplished by providing a gas in the upper modules which has a higher specific heat or greater heat conductivity than the gas of the lower modules. Alternatively, the mass of the upper module may be larger than that of the lower module so that heat may be conducted away more rapidly, or the upper modules may be of a design that enhance the convective cooling of the gas to a greater extent than the lower modules. In this manner the glass sheet may be more centrally located in the gap between the opposing module beds. In the case of glass sheets coated on one surface, as with a heat reflective film, balanced heat removal may require an increased flow and/or a decreased temperature of the gas impinged upon the coated side. The converse would be true for a heat absorbing film.

Variations in module design, including the embodiments of quenching modules disclosed herein, affect the total heat transfer from the glass by changing the actual and relative contributions to heat removal of the module and the gaseous fluid used for support.

The use of a gas other than air and having a higher thermal conductivity is contemplated, as suggested above, to further increase the heat transfer with a given flow of gas. Alternatively, other fluids, such as molten salts, may be used to further increase the rate of heat transfer.

Because of the opposing force upon the glass provided by the upper module bed, gas flow rates through the modules may be and usually are increased above those used to provide support. In this manner, the heat transfer coefficient of the quench system may be increased. The resulting stress created in the glass by the quenching process will depend upon the thickness of the glass and the rate at which it is cooled. Thus, while the example set forth herein shows the tempering of quarter-inch-thick glass to a stress of 3200 millimicrons per inch, it is possible, by using increased flow rates and improved module designs to produce tempered glass as thin as one-eighth inch in thickness having a stress of as much as 4300 millimicrons per inch. In the same manner, the stress in quarter-inch-thick glass can be increased to a level of about 6000 millimicrons per inch.

Gas flow rates for tempering, consistent with acceptable support characteristics, may vary in the range of from 50 to 750 cubic feet per minute per square foot of glass area, depending upon the temperature, heat transfer characteristics of the gas, the thickness of the glass, the spacing between the modules and the glass, and the final stress desired. For example, it has been found that a sheet of glass having an average approximate thickness of about 0.25 inch can be tempered to a residual center tension of above 3200 millimicrons per inch in the manner described in the tempering example set forth above, but with smaller gaps between the glass surfaces and the opposing modules (e.g., on the order of 0.006 to 0.020 inch), with an air flow rate of approximately 50 standard cubic feet per minute on each side per square foot of glass area; and a sheet of glass having an average approximate thickness of 0.088 inch can be tempered to approximately 3200 millimicrons per inch in the same manner but with an air flow rate of approximately 350 to 375 standard cubic feet per minute on each side per square foot of glass area. Glass sheets having an average approximate thickness of 0.125 and 0.135 inch may also be tempered to 3200 millimicrons per inch in this manner with an air flow of about 200 standard cubic feet per minute on each side per square foot of glass area. For tempering most sheets of glass (e.g., ¼ inch thick and below), the glass temperature should be above 1100 degrees Fahrenheit, preferably between about 1150 and 1300 degrees Fahrenheit, and the air temperature of the quench should be below about 175 degrees Fahrenheit. For tempering thicker glass, for example one inch thick sheets, the air temperature should be higher, often above 400 degrees Fahrenheit.

The following is a table indicating, by way of example, degrees of temper expressed in terms of center tension produced in sheets of glass of different thicknesses using an upper and lower bed of quench modules of the type shown in FIG. 20, the other conditions being as indicated:

| Glass Thickness (inches) | Center Tension (mu/in.) | Air Flow Rate s.c.f.m.[1] | Temp. of Quenching Air (° F.) (ambient) | Glass Temp.[2] (° F.) | Module to Glass Spacing (inches)[3] |
|---|---|---|---|---|---|
| 0.088 | 3,300 | 360 | 80–100 | 1,260 | 0.020 |
| 0.135 | 3,200 | 201 | 80–100 | 1,260 | 0.010 |
| 0.135 | 3,250 | 216 | 80–100 | 1,220 | 0.015 |
| 0.135 | 3,600 | 288 | 80–100 | 1,260 | 0.020 |
| 0.135 | 4,340 | 360 | 80–100 | 1,260 | 0.020 |
| 0.174 | 5,700 | 430 | 80–100 | 1,260 | 0.020 |
| 0.233 | 3,400 | 144 | 80–100 | 1,180 | 0.015 |
| 0.233 | 3,400 | 108 | 80–100 | 1,260 | 0.015 |
| 0.233 | 4,800 | 324 | 80–100 | 1,180 | 0.015 |
| 0.233 | 5,800 | 360 | 80–100 | 1,260 | 0.015 |
| 0.243 | 6,075 | 430 | 80–100 | 1,260 | 0.020 |

[1] Air flow rate through upper and lower module beds of a quenching section expressed in standard cubic feet per minute per square foot of glass surface area being quenched.
[2] Prior to quenching.
[3] Spacing designated is one-half the difference between the total spacing between upper and lower module beds and the glass thickness.

The spacing between the glass sheet and the upper and lower module beds of the quench system is unequal when the module beds are similar and the same quench medium is used in both because the gas flow is adjusted to provide equal heat transfer and, of course, at comparable flows the glass will be somewhat closer to the bottom module bed than the top. Spacing below the glass may vary from 0.003 to 0.050 inch, and spacing above the glass may vary from 0.010 to 0.1 inch. The latter spacing is generally greater than the former, although substantially equal spacing may be obtained as explained earlier. The lower spacing must, of course, provide clearance sufficient to allow trouble-free processing of glass sheets in a commercial operation.

The nature of the gas film support of the present invention requires that the glass sheets conform substantially to the configuration of the module bed. It is, therefore, necessary that the addition of heat to the sheets during the conveying process be applied to both major surfaces in substantially equal quantities to prevent bowing or other warpage of the sheets. This has been accomplished, as disclosed in the specific example showing the operation of the invention, by supporting the glass on heated gas and balancing the heating by providing a separate source which will heat the upper side of the glass. Thus electrical or gas heaters are disposed in the roof or other section of the lehr as a source of radiant heat.

Actually, the provision of a separate source of radiant heat, such as electric or gas radiant heaters, is a very effective means of control. Usually it is convenient to supply the supporting gas at a substantially constant temperature for a relatively long period of time. This is true even though the temperature of the gas may be raised from plenum to plenum and module bank to module bank as the sheet progresses over the bed.

Variations in heat required and thus control of the system may be achieved readily by controlling the rate and amount of heat input from the electric heaters or like independent source. Generally the temperature of the independent heat source is at least 25 to 50 degrees Fahrenheit higher than the temperature of the supporting gas.

Thus, in the area where the glass is raised to its maximum temperature, for example 1200 to 1250 degrees Fahrenheit, the supporting gas is held at substantially the same temperature and the electrical heaters are set to supply heat at not less than 50 to 100 degrees higher, i.e., 1250 to 1350 degrees Fahrenheit or above. These heaters are actuated by thermocouples (not shown) which turn the heaters or a portion of them on and off as the load on the system demands.

Similar radiant heat sources are disposed in other portions of the furnace to accomplish the same result and/or to maintain the required temperature in such other portions.

Another alternative for assuring equal heating is to provide an upper module bed in the heating section in a manner similar to the upper module bed in the quenching section. Hot products of combustion are emitted from the upper modules as well as from the lower support modules at flow rates adjusted to provide adequate support characteristics and equal heat transfer to both major surfaces of the glass sheets.

While rotating disks in edge contact with the gas-supported glass have been disclosed for conveying the glass sheets through the heating and quenching sections, equivalent means, such as one or more moving endless belts, can be used to engage and move the edge of the glass, particularly where the glass plates are of such a shape that they present no flat edge of sufficient length to bridge the gap from one disk to the next. Rather than engaging an edge with the belt, moving fingers or other extensions can project from an endless belt, either from the side or, in the heating section, from overhead to engage the trailing edge of the glass to push it along. With similar arrangement to those just described, the support bed could be tilted in the direction of glass travel. In that instance, the disks or endless belt are utilized to retard the speed of travel imparted by gravitational force to assure proper spacing and adequate treatment of the glass sheets in the different sections. In addition, banks or sections of modules may be spaced from each other, and horizontal rolls extending transversely of the path of travel may be disposed between these sections so as to contact the lower surface of the glass sheets to frictionally drive and/or partially support the sheets.

As shown in FIGS. 11 and 19, the support gas flows over walls of the individual modules into a continuous exhaust zone. The flow of this gas may be reversed by providing orifices or pressure drop devices in outlets 39 (FIG. 12) and in such a case there is provided a continuous support zone communicating with individual exhaust modules.

It should be evident from the above section that while in the foregoing disclosure certain preferred embodiments of the invention have been disclosed, numerous modifications or alterations may be made therein without departing from the spirit and scope of the invention as set forth in the appended claim.

We claim:

In a method of heating glass sheet at a deformation temperature while the sheet is disposed on a fluid support bed having a plurality of outlets to which support fluid is supplied, the improvement which comprises supplying said fluid to part of said outlets at a pressure greater than the fluid is supplied to others of said outlets.

References Cited

UNITED STATES PATENTS 3,223,501   12/1965   Fredley et al. _____ 65—25

DONALL H. SYLVESTER, *Primary Examiner.*

A. D. KELLOGG, *Assistant Examiner.*